United States Patent
Altieri et al.

(10) Patent No.: US 7,389,162 B2
(45) Date of Patent: Jun. 17, 2008

(54) AIRCRAFT VEHICULAR PROPULSION SYSTEM MONITORING DEVICE AND METHOD

(75) Inventors: Russell E. Altieri, Cary, NC (US); James F. Kuhn, Erie, PA (US); Mark R. Jolly, Raleigh, NC (US); Steve C. Southward, Apex, NC (US); Askari Badre-Alam, Apex, NC (US); Leslie P. Fowler, Cary, NC (US)

(73) Assignee: Lord Corporation, Cary, NC (US)

( * ) Notice: Subject to any disclaimer, the term of this patent is extended or adjusted under 35 U.S.C. 154(b) by 0 days.

(21) Appl. No.: 11/224,563

(22) Filed: Sep. 12, 2005

(65) Prior Publication Data
US 2007/0233329 A1 Oct. 4, 2007

Related U.S. Application Data

(62) Division of application No. 10/421,325, filed on Apr. 23, 2003, now Pat. No. 6,954,685.

(60) Provisional application No. 60/374,752, filed on Apr. 23, 2002.

(51) Int. Cl.
*G01B 7/31* (2006.01)
*G01M 13/02* (2006.01)
*G06F 19/00* (2006.01)

(52) U.S. Cl. .......... 701/3; 701/5; 701/29; 701/51; 73/866.1; 73/862.339; 702/151

(58) Field of Classification Search .......... 701/1, 701/3, 5, 29, 51; 73/866.1, 862.332, 862.339, 73/862.142; 702/151, 155
See application file for complete search history.

(56) References Cited

U.S. PATENT DOCUMENTS

| | | | | |
|---|---|---|---|---|
| 3,745,544 A | * | 7/1973 | Ono | ............... 340/870.22 |
| 3,783,522 A | * | 1/1974 | Dodd | .................. 33/661 |
| 4,028,619 A | | 6/1977 | Edwards | |

(Continued)

FOREIGN PATENT DOCUMENTS

EP 0 632 250 A1 6/1994

(Continued)

*Primary Examiner*—Tan Q. Nguyen
(74) *Attorney, Agent, or Firm*—Edward F. Murphy, III

(57) ABSTRACT

Methods and systems for monitoring rotating shaft shafts and couplings in an aircraft propulsion system is described. The measurement system/method provides for accurate and precise monitoring of a rotating shaft flexible coupling in a fixed wing aircraft vehicle propulsion system. The measuring system/method provides for a high reliability short take off vertical landing fixed wing aircraft in which the vertical propulsion dynamically rotating drive shaft system and couplings are monitored in real time. The vehicular shaft coupling misalignment measuring system utilizes multiple positional sensors to provide highly reliable and precise determination of the dynamic characteristics of the rotating sensor target components of the propulsion system drive shaft. The relative position of the sensors is rigidly fixed externally from the rotating targets with a structural frame. The collar misalignment measuring system of the invention provide a misalignment measurement of the propulsion system drive shaft flexible coupling which relates to a critical performance of rotating shaft coupling in the operation of an aircraft vehicle. The method/system provides for monitoring a rotating drive shaft system and dynamically measuring a rotating drive shaft coupling in a fixed wing aircraft propulsion system.

12 Claims, 18 Drawing Sheets

U.S. PATENT DOCUMENTS

| | | | |
|---|---|---|---|
| 4,033,042 A | | 7/1977 | Bently |
| 4,115,925 A | * | 9/1978 | Malak ......................... 33/661 |
| 4,184,562 A | | 1/1980 | Bakamjian |
| 4,319,189 A | | 3/1982 | Cullum, Jr. et al. |
| 4,518,917 A | * | 5/1985 | Oates et al. ............ 324/207.25 |
| 4,630,033 A | * | 12/1986 | Baker ........................ 341/11 |
| 4,678,993 A | | 7/1987 | Vinnemann et al. |
| 4,746,859 A | * | 5/1988 | Malik .................... 324/207.12 |
| 4,828,203 A | | 5/1989 | Clifton et al. |
| 4,839,590 A | | 6/1989 | Koski et al. |
| 4,891,992 A | | 1/1990 | Kobayashi et al. |
| 4,907,462 A | | 3/1990 | Obama et al. |
| 4,943,773 A | | 7/1990 | Koski et al. |
| 5,017,867 A | | 5/1991 | Dumais et al. |
| 5,038,615 A | | 8/1991 | Trulson et al. |
| 5,107,711 A | | 4/1992 | Aoki et al. |
| 5,313,159 A | | 5/1994 | Allwine, Jr. |
| 5,334,933 A | | 8/1994 | Tellerman |
| 5,363,317 A | | 11/1994 | Rice et al. |
| 5,420,589 A | | 5/1995 | Wells et al. |
| 5,430,432 A | | 7/1995 | Camhi et al. |
| 5,435,073 A | * | 7/1995 | Sullivan ...................... 33/661 |
| 5,449,418 A | | 9/1995 | Takagi et al. |
| 5,495,774 A | | 3/1996 | Klauber et al. |
| 5,508,609 A | * | 4/1996 | Parkinson et al. ...... 324/207.25 |
| 5,514,952 A | | 5/1996 | Parkinson |
| 5,587,969 A | | 12/1996 | Kroemer et al. |
| 5,717,330 A | | 2/1998 | Moreau et al. |
| 5,736,855 A | | 4/1998 | Smith et al. |
| 5,760,302 A | | 6/1998 | Moradi et al. |
| 5,796,247 A | | 8/1998 | Pape |
| 5,877,420 A | | 3/1999 | Moradi et al. |
| 5,902,934 A | | 5/1999 | Sprague et al. |
| 5,922,952 A | | 7/1999 | Moradi et al. |
| 5,998,899 A | | 12/1999 | Rosen et al. |
| 6,131,454 A | | 10/2000 | Kopp et al. |
| 6,326,781 B1 | | 12/2001 | Kunde et al. |
| 6,351,117 B1 | | 2/2002 | Ehling |
| 6,389,887 B1 | | 5/2002 | Dusserre-Telmon et al. |
| 6,393,904 B1 | | 5/2002 | Krug et al. |
| 6,427,308 B1 | * | 8/2002 | Brunken, Jr. ................. 29/434 |
| 6,441,608 B2 | | 8/2002 | Brunsch et al. |
| 6,490,934 B2 | * | 12/2002 | Garshelis ............... 73/862.336 |
| 6,516,286 B1 | | 2/2003 | Aebischer et al. |
| 6,538,429 B2 | | 3/2003 | Schroeder et al. |
| 6,757,635 B2 | | 6/2004 | Topmiller |
| 6,856,936 B1 | | 2/2005 | Chen et al. |

FOREIGN PATENT DOCUMENTS

| | | |
|---|---|---|
| EP | 0889316 A2 | 7/1999 |
| EP | 1 059 511 A1 | 1/2000 |
| WO | WO 96/01410 | 1/1996 |
| WO | WO 98/34455 | 8/1998 |

* cited by examiner

AIRCRAFT VEHICULAR PROPULSION SYSTEM MONITORING DEVICE AND METHOD

CROSS REFERENCE

This application is a divisional of U.S. patent application Ser. No. 10/421,325, filed Apr. 23, 2003 now U.S. Pat. No. 6,954,685, which the benefit of is claimed and is incorporated by reference. This application claims the benefit of, and incorporates by reference, U.S. Provisional Patent Application No. 60/374,752 filed on Apr. 23, 2002.

This invention was made with government support under contract N00019-02-C-3003, awarded by the United States Department of Defense. The United States Government may have certain rights in this invention.

FIELD OF THE INVENTION

The present invention relates to a method/system for monitoring a rotating drive shaft system. More particularly the invention relates to a method/system for dynamically monitoring a rotating drive shaft coupling in a fixed wing aircraft propulsion system.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principals and operation of the invention.

BACKGROUND OF THE INVENTION

Reference will now be made in detail to the present preferred embodiments of the invention, examples of which are illustrated in the accompanying drawings.

There is a need for a system and method of accurately and economically monitoring a rotating shaft coupling of a high speed rotating shaft system. There is a need for an economically feasible method of dynamically measuring a rotating shaft to provide dynamic real time monitoring of rotating positional characteristics of the rotating shaft and its rotating members. There is a need for a robust system and method of measuring rotational positional dynamic characteristics of a rotating drive shaft coupling in the propulsion system at a fixed wing vertical short take off and landing aircraft vehicle. There is a need for an economic aircraft vehicular propulsion system monitoring device and method.

SUMMARY OF THE INVENTION

The invention includes a V/STOL (vertical short take off and landing) fixed wing aircraft having an aircraft propulsion system with an engine and a lift fan, with the engine coupled to the lift fan with at least one drive shaft and at least one flexible coupling, the flexible coupling comprised of a first coupling hub member including a magnetic target and a second coupling hub member including a magnetic target, the first coupling hub member flexibly coupled to the second coupling hub member, the flexible coupling providing for a mechanical transfer of motive power from the engine to the lift fan, and a flexible coupling sensor rigid collar misalignment measuring system encompassing the flexible coupling, the flexible coupling sensor rigid collar comprised of a first magnetostrictive sensor, a second magnetostrictive sensor, and a third magnetostrictive sensor, the first magnetostrictive sensor, the second magnetostrictive sensor, and the third magnetostrictive sensor rigidly fixed around the collar with the sensors external of the coupling hub member magnetic targets, the first magnetostrictive sensor fixed a first fixed angular distance from the second magnetostrictive sensor, the third magnetostrictive sensor fixed a second fixed angular distance from the second magnetostrictive sensor. The flexible coupling sensor rigid collar misalignment measuring system magnetostrictive sensors magnetically monitor a position of the first coupling hub member relative to a position of the second coupling hub member to provide a misalignment measurement of the flexible coupling which relates to a performance of the coupling in the V/STOL fixed wing aircraft.

The invention includes an aircraft vehicle propulsion system, with the vehicle propulsion system comprising an engine and a drive unit propeller, with the engine coupled to the propeller with a drive shaft and a flexible coupling, the flexible coupling comprised of a first coupling hub member and a second coupling hub member, the first coupling hub member flexibly coupled to the second coupling hub member, the flexible coupling providing for a mechanical transfer of motive power from the engine to the propeller, a flexible coupling sensor rigid collar measurement system encompassing the flexible coupling, the flexible coupling sensor rigid collar measurement system comprised of a first sensor, a second sensor, and a third sensor, the first sensor, the second sensor, and the third sensor angularly spaced and rigidly fixed around the collar wherein the sensor rigid collar system monitors the flexible coupling and provides for a noncontact measuring of a plurality of positional characteristics of the first coupling hub member and the second coupling hub member which relate to the transfer of motive power.

The invention includes a method of monitoring a vehicular propulsion system drive shaft flexible coupling. The method comprises providing a vehicular propulsion system drive shaft flexible coupling with a first coupling hub member with a sensor target and a second coupling hub member with a sensor target, providing a flexible coupling sensor rigid collar measurement system with a first sensor, a second sensor, and a third sensor, encompassing the first coupling hub member sensor target and the second coupling hub member sensor target with the flexible coupling sensor rigid collar measurement system while inhibiting a physical contact between the flexible coupling sensor rigid collar measurement system and the vehicular propulsion system drive shaft flexible coupling, with the first sensor, the second sensor, and the third sensor angularly spaced around and external from the flexible coupling, and noncontactingly measuring a plurality of positional characteristics of the first coupling hub member and the second coupling hub member to monitor a performance of the vehicular propulsion system drive shaft flexible coupling which relates to a transfer of motive power through the vehicular propulsion system drive shaft flexible coupling.

The invention includes a method of monitoring a drive shaft coupling. The method including providing a drive shaft coupling with a first coupling hub member with a sensor target and a second coupling hub member with a sensor target, providing a coupling sensor rigid collar measurement system with a first sensor, a second sensor, and a third sensor, encompassing the first coupling hub member sensor target and the second coupling hub member sensor target with the coupling sensor rigid collar measurement system while inhibiting a physical contact between the coupling sensor rigid collar measurement system and the drive shaft coupling, with the first sensor, the second sensor, and the third sensor angularly spaced around the coupling, and noncontactingly measuring a plurality of positional characteristics of the first coupling hub member and the second coupling hub member to monitor a performance of the drive shaft coupling which relates to a transfer of motive power through the drive shaft coupling.

The invention includes a method of monitoring a coupling drive shaft system. The method including providing a drive shaft coupling system with a first rotating member with a sensor target and a second rotating member with a sensor target, providing a sensor rigid collar measurement system with a first sensor, a second sensor, and a third sensor, encompassing said first rotating member sensor target and said second rotating member sensor target with said sensor rigid collar measurement system while inhibiting a physical contact between said collar measurement system and said rotating members, with said first sensor, said second sensor, and said third sensor angularly spaced around said rotating members, noncontactingly measuring a plurality of rotating positional characteristics of said first rotating member and said second rotating member to monitor a performance of said drive shaft system which relates to a transfer of motive power through said drive shaft system, providing for a correction change in said drive shaft system when a measured rotating positional characteristic performance of said drive shaft system exceeds a measured rotating positional characteristic performance limitation.

The invention includes a shaft coupling measurement system for noncontactingly monitoring a coupling, with the coupling comprised of a first coupling hub member including a electromagnetic target and a second coupling hub member including a electromagnetic target, the first coupling hub member flexibly coupled to the second coupling hub member, a coupling sensor rigid collar misalignment measuring system encompassing the coupling, with the coupling sensor rigid collar comprised of a first electromagnetic magnetostrictive sensor, a second electromagnetic magnetostrictive sensor, and a third electromagnetic magnetostrictive sensor, the first sensor, the second sensor, and the third sensor rigidly fixed around the collar, the first sensor fixed a first fixed angular distance from the second sensor, the third sensor fixed a second fixed angular distance from the second sensor, and the coupling sensor rigid collar measuring system sensors noncontactingly monitor a position of the first coupling hub member relative to a position of the second coupling hub member to provide a measurement of the coupling which relates to a performance of the coupling.

The invention includes a method of monitoring a drive shaft system. The method includes providing a drive shaft system with a first rotating member with a magnetic sensor target and providing a sensor rigid measurement system with a magnetostrictive sensor proximate the first rotating member sensor target while inhibiting a physical contact between the measurement system magnetostrictive sensor and the rotating member, magnetostrictively measuring a rotating positional characteristic of the first rotating member to monitor a performance of the drive shaft system.

The invention includes a rotating shaft measurement system for noncontactingly monitoring a rotating member including a magnetic sensor target, with the rotating shaft measurement system including a sensor rigid collar comprised of a first magnetostrictive sensor. The first magnetostrictive sensor is rigidly fixed on the sensor rigid collar proximate the rotating member, wherein the sensor rigid collar measurement system first magnetostrictive sensor noncontactingly magnetostrictively monitors a position of the rotating member sensor target to provide a measurement of a rotating positional characteristic of the first rotating member to monitor a performance of the rotating member.

DETAILED DESCRIPTION OF THE PREFERRED EMBODIMENT

The invention includes a short take off and vertical landing (V/STOL Vertical Short Take Off and Landing) fixed wing aircraft having an aircraft propulsion system with an engine and a lift fan, with the engine coupled to the lift fan with at least one drive shaft and at least one flexible coupling, the flexible coupling comprised of a first coupling hub member including a magnetic target and a second coupling hub member including a magnetic target, the first coupling hub member flexibly coupled to the second coupling hub member, the flexible coupling providing for a mechanical transfer of motive power from the engine to the lift fan, and a flexible coupling sensor rigid collar misalignment measuring system encompassing the flexible coupling, the flexible coupling sensor rigid collar comprised of a first magnetostrictive sensor, a second magnetostrictive sensor, and a third magnetostrictive sensor, the first magnetostrictive sensor, the second magnetostrictive sensor, and the third magnetostrictive sensor rigidly fixed around the collar, the first magnetostrictive sensor fixed a first fixed angular distance from the second magnetostrictive sensor, the third magnetostrictive sensor fixed a second fixed angular distance from the second magnetostrictive sensor. The flexible coupling sensor rigid collar misalignment measuring system magnetostrictive sensors magnetically monitor a position of the first coupling hub member relative to a position of the second coupling hub member to provide a misalignment measurement of the flexible coupling which relates to a performance of the coupling in the V/STOL fixed wing aircraft.

Figure 1A:
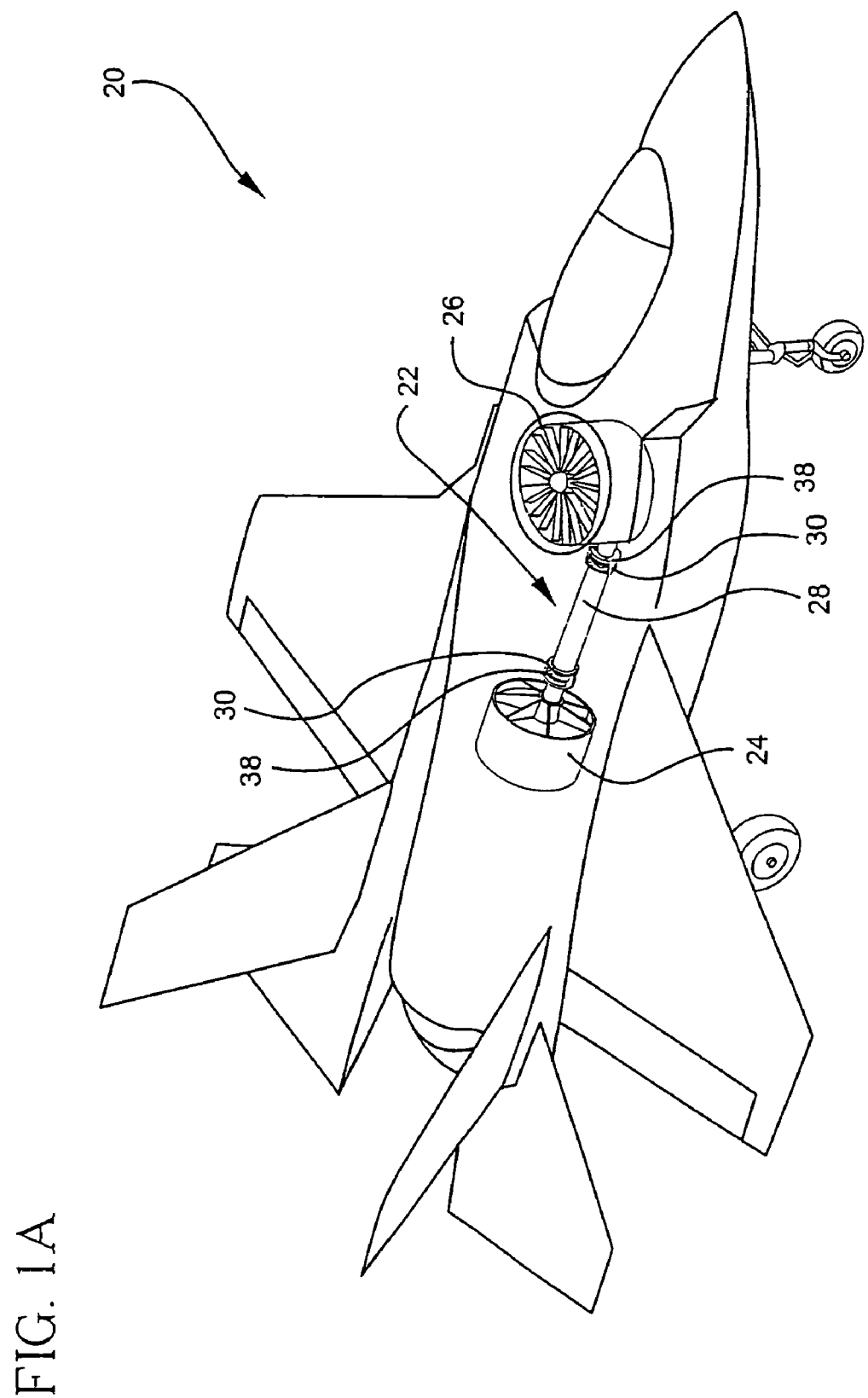
FIG. 1A-B show an embodiment of the invention.
Figure 1B:
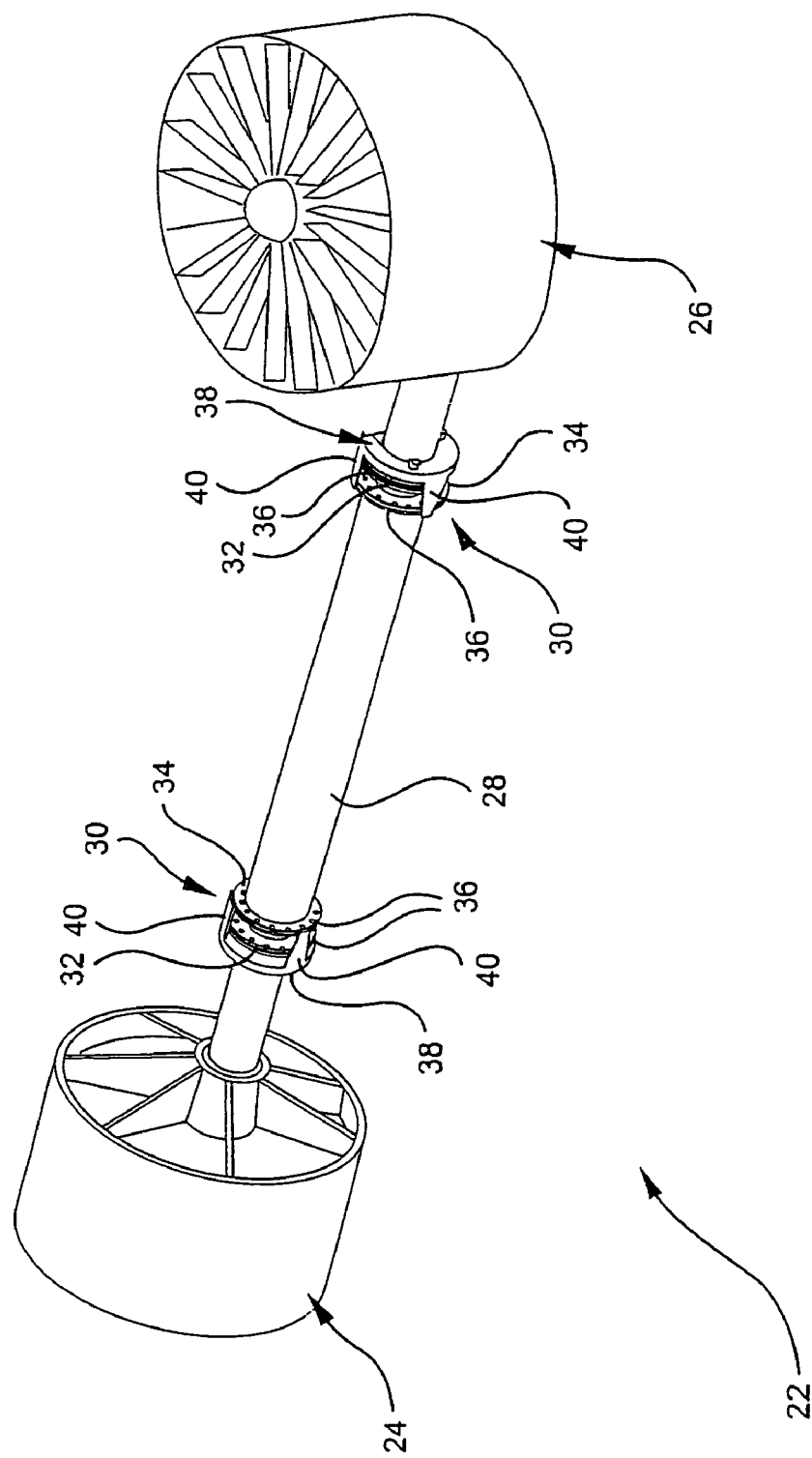
Figure 2A:
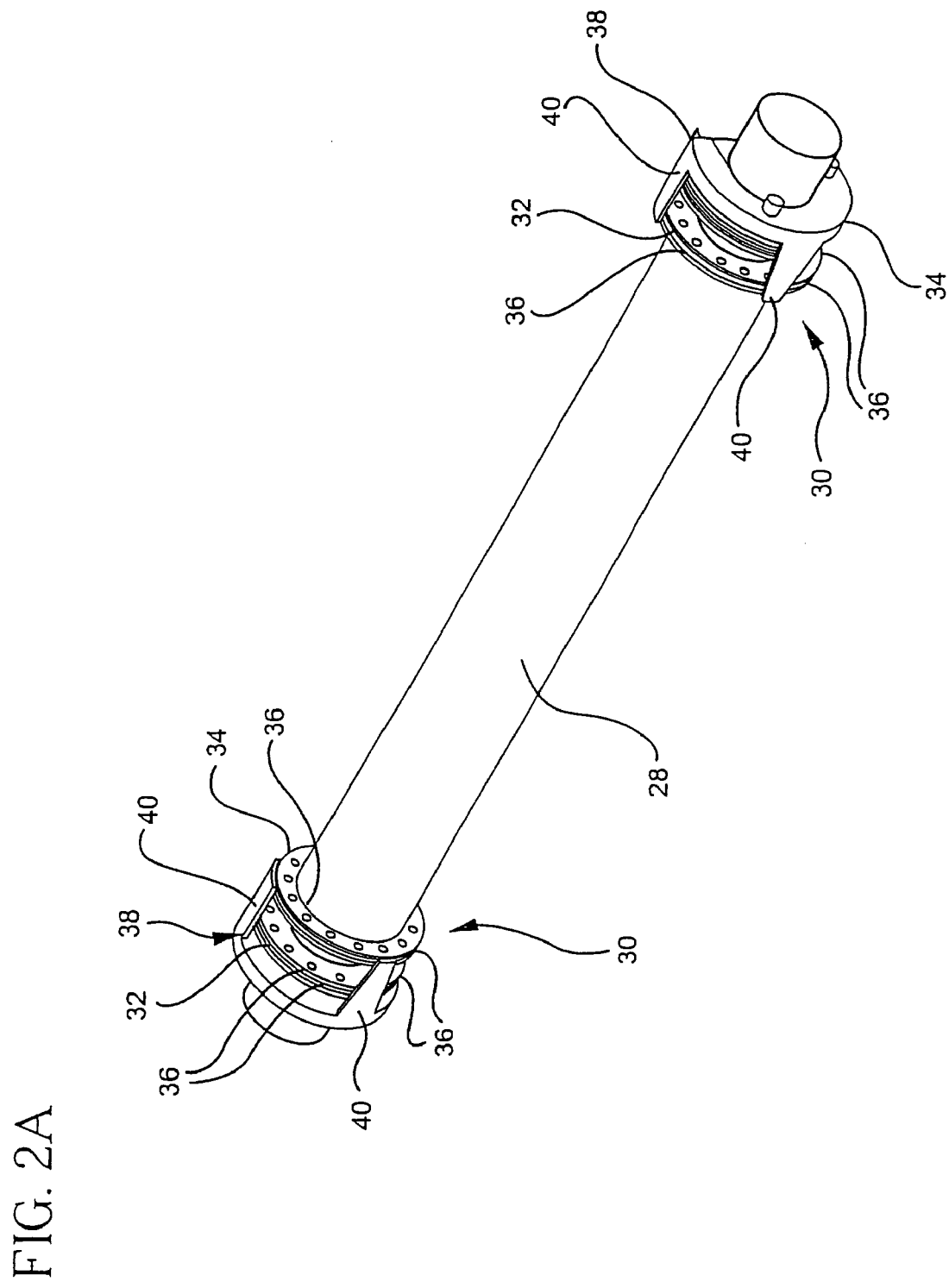
FIG. 2A-B show an embodiment of the invention.
Figure 2B:
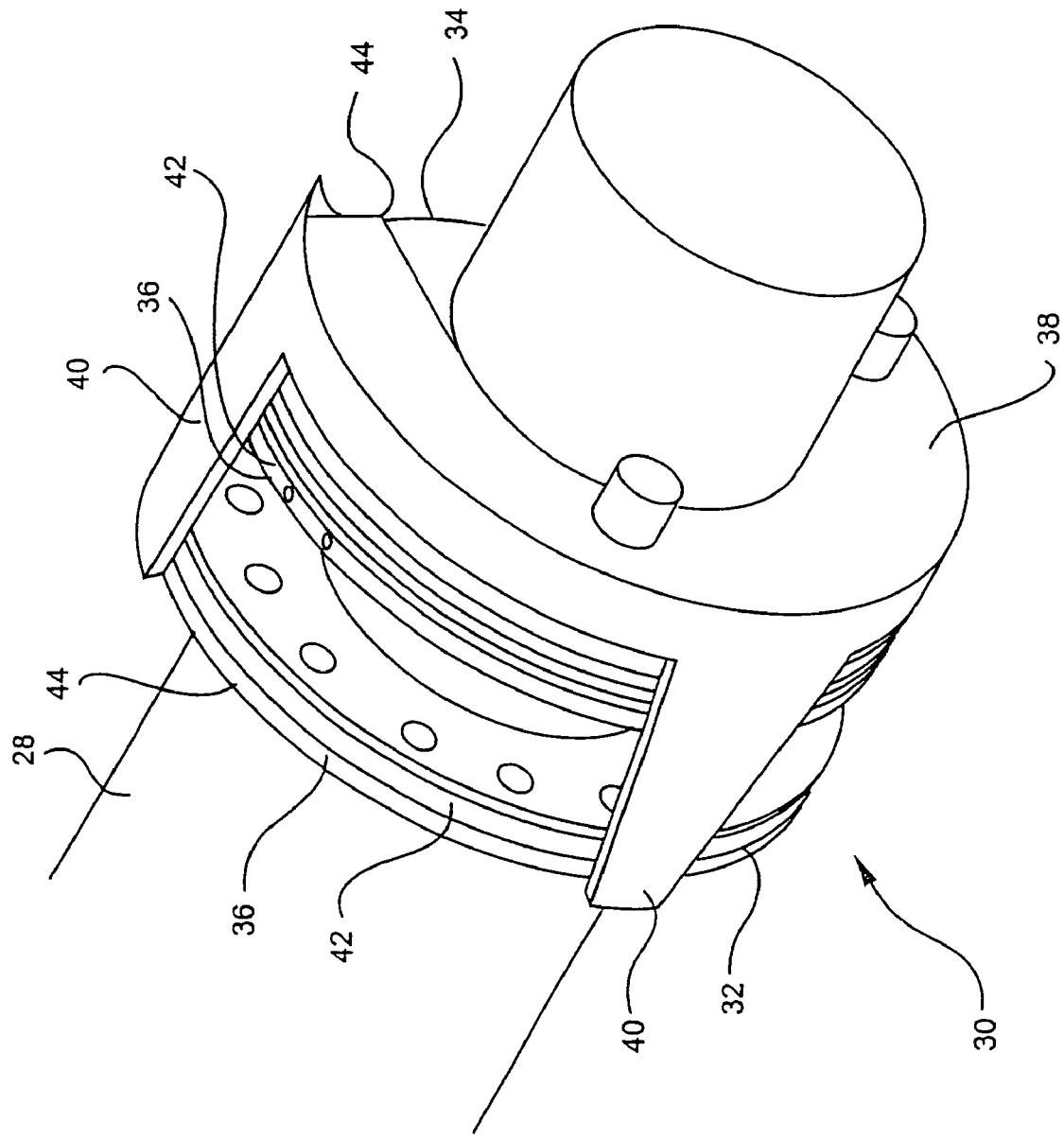

As shown in FIG. 1, the invention includes a short take off and vertical landing (V/STOL Vertical Short Take Off and Landing) fixed wing aircraft 20 having an aircraft propulsion system 22 with an engine 24 and a lift fan 26, with the engine coupled to the lift fan with at least one drive shaft 28 and at least one flexible coupling 30. As shown in FIG. 1B, flexible coupling 30 is comprised of a first coupling hub member 32 and a second coupling hub member 34. The coupling hub members include sensor targets 36, preferably the sensor targets have magnetic properties, and preferably are comprised of a magnetically conducting material or are comprised of at least one magnet. The preferred magnetically conducting material are ferrous, preferably ferrous metals of iron or steel. The preferred at least one magnet is a permanent magnet. Sensor targets 36 preferably are electromagnetic (EM) radiation spectrum detectable sensor targets which can be detected by electromagnetic sensors 40, most preferably sensor targets 36 are magnetic property targets which can be detected by an EM magnetostrictive sensor 40. The first coupling hub member 32 including its sensors target 36 is flexibly coupled to the second coupling hub member 34 which includes a sensor target 36 with the flexible coupling providing for a mechanical transfer of motive power from engine 24 to lift fan 26. The invention includes a coupling sensor rigid collar misalignment measuring system 38 encompassing flexible coupling 30. Flexible coupling sensor rigid collar measuring system 38 is comprised of a first EM sensor 40, a second EM sensor 40, and a third EM sensor 40. Preferably, the EM sensors 40 are magnetostrictive sensors. First, second, and third magnetostrictive sensors 40 are rigidly fixed around collar 38 with the magnetostrictive sensors external from the magnetostrictive sensor targets 36 with first sensor 40 fixed a first fixed angular spacing distance from second sensor 40 and third sensor 40 fixed a second fixed angular spacing distance from second sensor 40. Preferably first, second, and third magnetostrictive sensors 40 are equally spaced apart with the first fixed angular spacing distance equal to the second fixed angular spacing distance. Sensors 40 are rigidly fixed and spaced apart at angular spacing distances around collar 38 to provide for sensing a sensed reference plane for first coupling hub member 32 and a sensed reference plane for second coupling hub member 34. First, second, and third magnetostrictive sensors 40 are spaced apart and external from sensor targets 36 which sensors 40 detecting the position of sensor targets 36 along their longitudinal lengths. First, second, and third magnetostrictive sensors 40 are angularly spaced around sensor targets 36 with sensors 40 detecting the position of sensor targets 36 along their longitudinal magnetostrictive waveguide body lengths to provide a first measured distance between the sensor targets 36, a second measured distance between the sensor targets 36, and a third measured distance between the sensor targets 36, that provide a plurality of simultaneous measured distances from the rotating shaft first coupling hub member 32 to the rotating shaft second coupling hub member 34 that are than transformed into an angular misalignment angle and an axial displacement distance for the rotating shaft coupling 30. In a preferred embodiment as shown in FIG. 2, the fixed angular distances are about 120°. Preferably fixed angular distances spacing of spacing of sensors 40 is at least 45°. Preferably the fixed angular distance of sensors 40 is in the range of 60° to 120°. Preferably, sensor rigid collar measuring system 38 has at least three sensors 40. In a preferred embodiment sensor rigid collar measuring system 38 has four sensors 40. In a preferred embodiment sensor rigid collar measuring system 38 has five sensors 40. Preferably rigid collar measuring system 38 has "n" sensors with $n \geq 3$ and the "n" sensors separated by a fixed angular distance $\emptyset n$ with $\emptyset n \geq 90°/(n-1)$, more preferably $\emptyset n \geq 120°/(n-1)$. Magnetostrictive sensors 40 rigidly fixed and spaced apart on collar 38 utilize magnetism to monitor a position of first coupling hub member 32 relative to a position of a second coupling hub member 34 to provide a misalignment measurement of flexible coupling 30 with relates to the performance of coupling 30 in aircraft vehicle 20 and the transfer of propulsion system power from engine 24 to propelling drive unit rotor lift fan 26. Sensors 40 magnetically detect the position of the coupling hub member target, preferably utilizing magnetostriction deformation within the sensors.

Figure 3:
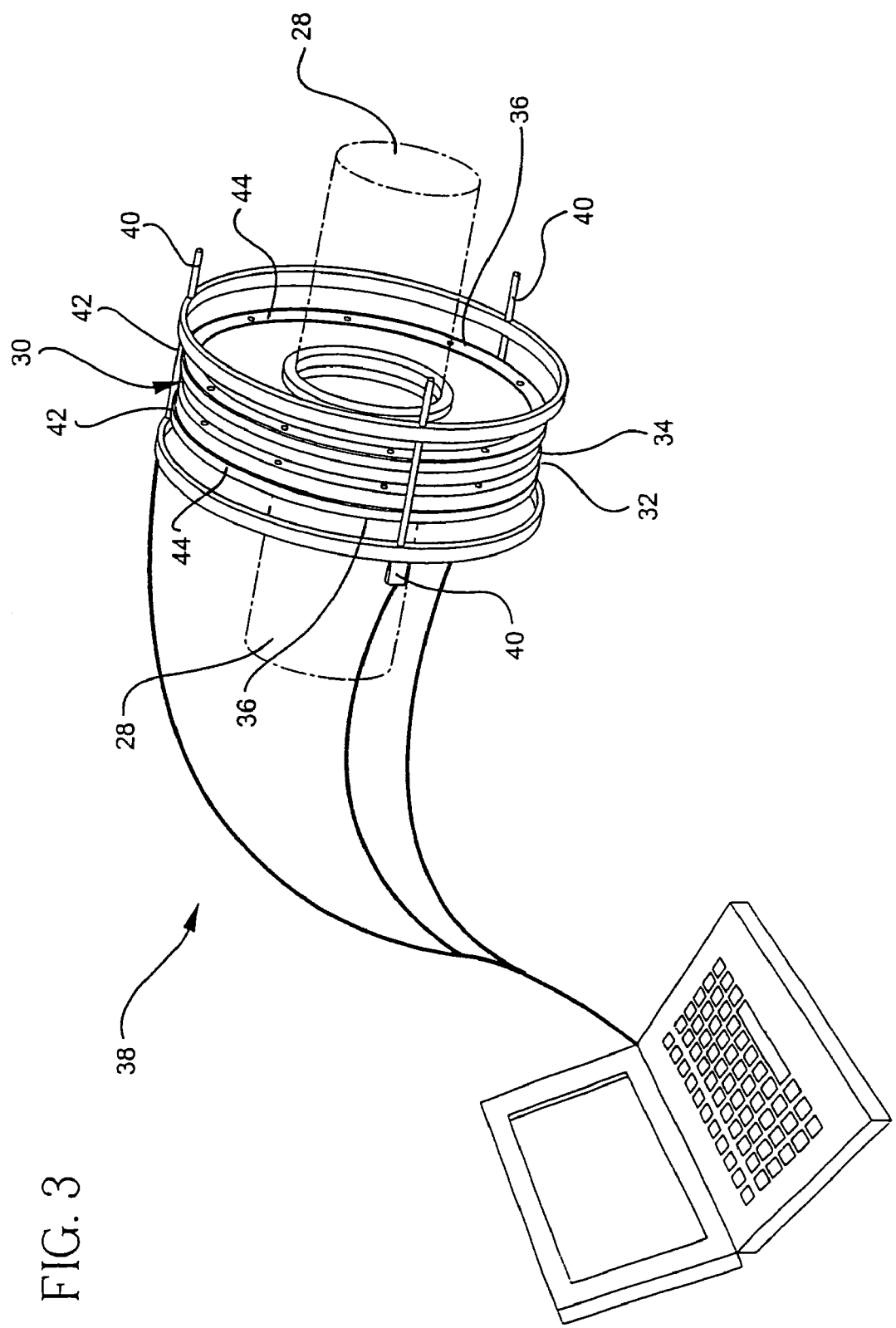
FIG. 3 shows an embodiment of the invention.
Figure 4:
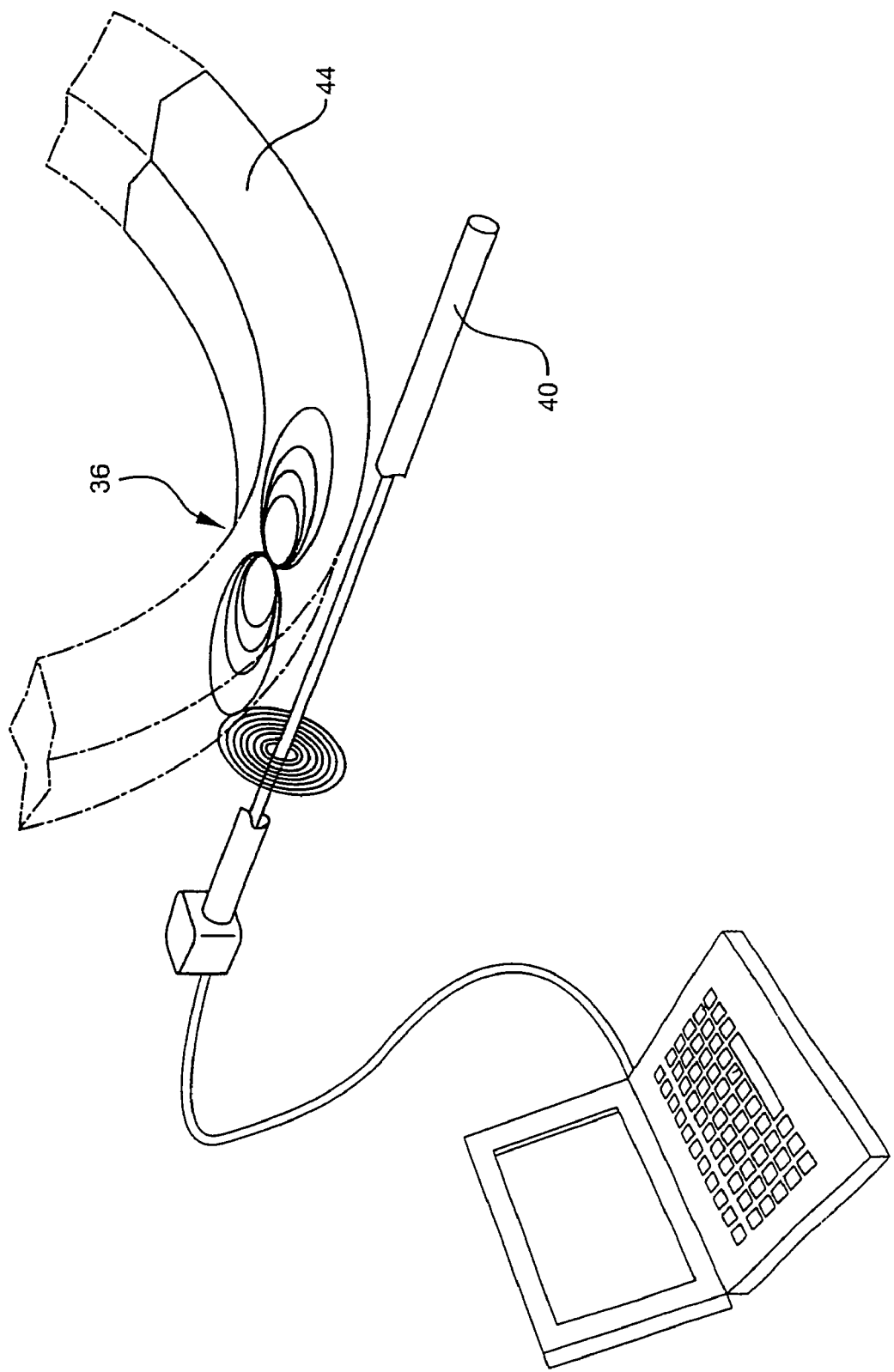
FIG. 4 shows an embodiment of the invention.

As shown in FIG. 1-2, the engine 24 output shaft is coupled through a first coupling 30 with a coupling sensor rigid collar misalignment measurement system 38 to a first end of drive shaft 28. At the other end of rotating drive shaft 28, drive shaft 28 is coupled through a second rotating coupling 30 with a coupling sensor rigid collar misalignment measurement system 38 to the rotating input shaft of lift fan 26 with engine 24 driving the rotation of lift fan 26. The second coupling shaft is inputted into a clutch that turns lift fan 26 that provides vertical thrust for aircraft vehicle 20 that allows for short take off and vertical landing of the aircraft. Coupling sensor rigid collar measurement system 38 provides accurate and precise noncontact measuring and monitoring of the performance of coupling 30 in the operation of the aircraft. The flexible coupling sensor rigid collar misalignment measuring system 38 magnetostrictive sensors 40 magnetically monitor a position of the first coupling hub member 32 relative to a position of the second coupling hub member 34 to provide a misalignment measurement of the flexible coupling 30, and its drive shafts, which relates to the performance of the coupling in the aircraft. FIG. 3 shows an embodiment of the invention with three magnetostrictive sensors 40 equally spaced around the collar of coupling sensor rigid misalignment measurement system 38 with the sensors fixed with an angular distance of about 120 degrees. FIG. 4 shows magnetostrictive sensor 40 noncontactingly electromagnetically sensing hub member sensor target 36 with the interaction of magnetic fields. In a preferred embodiment of the invention the magnetostrictive sensor 40 is used to magnetostrictively determine the location of magnetic ring 44 of sensor target 36 along the longitudinal length of magnetostrictive sensor element body. Preferably the magnetostrictive sensors 40 are used to determine the location of two separated rotating shaft coupling hub members (32,34) by magnetostrictively determining the location of two magnetic rings 44 of two separated rotating shaft sensor targets 36 along the longitudinal length of the magnetostrictive sensor element body. An electromagnetic interrogation pulse from the magnetostrictive sensor element head forms an interrogation pulse magnetic field along the entire length of the sensor element body which interacts with the rotating sensor target 36 magnetic field of the coupling hub sensor target magnetic ring 44 to form a magnetically induced strain pulse wave in the sensor 40. From its interacting magnetic fields (interaction of interrogation pulse magnetic field with the magnetic field of the rotating coupling hub sensor target magnetic ring) induced origination point the magnetically induced strain pulse wave travels at sonic speed along the magnetostrictive sensor waveguide body length to the sensor element detection head sense EM coil. The magnetically induced strain pulse wave travel time is used to determine the length of the travel along the sensor 40 that indicates the position of the induced origination point along the length of sensor waveguide body and the position of the coupling hub sensor target magnetic ring. Preferably the travel times of two magnetically induced strain pulse waves from the two separated sensor target magnetic rings 44 is utilized to monitor the separation distance between the two separated rotating shaft coupling hub members (32,34).

FIG. 6A-D show embodiments of the invention which utilize a magnetically biased magnetostrictive sensor 40 to magnetostrictively detect the magnetic property sensor target 36 of rotating coupling hub member 32. Bias magnet 50 is provided proximate magnetostrictive sensor 40 to produce a magnetic field proximate magnetically conducting ferrous material hub member sensor target 36. Bias magnet 50 and rotating moving magnetically conducting ferrous sensor target 36 form a magnetic circuit with magnetically conducting ferrous sensor target 36 creating a field concentration in magnetostrictive sensor 40 at its location along the longitudinal length of magnetostrictive sensor 40 to provide for magnetostrictive detection of the target. With such an embodiment the magnetic sensor target 36 of rotating coupling hub member 32 does not need to include a permanent magnet, preferably with the magnetic sensor target 36 being the ferrous material which forms part of rotating coupling hub member 32. Permanent bias magnet 50 bias the magnetostrictive sensor 40 such that there is no relative motion between the permanent bias magnet and the magnetostrictive sensor. The magnetically conducting ferrous target moving in proximity to the magnetically-biased magnetostrictive sensor 40 creates local magnetic field concentrations at the sensor waveguide body that cause magnetically induced strain pulse wave acoustic reflections within the magnetostrictive material sensor waveguide body thus providing position measurement of the target 36 along the longitudinal length of magnetostrictive sensor 40. Such an embodiment of the invention eliminates the need for a moving permanent magnet ring 44 incorporated into rotating coupling hub members 32,34, since the magnetic property magnetically conducting ferrous material component of the rotating members is the magnetostrictive sensor target 36. In preferred embodiments the biasing magnet 50 subjects the magnetostrictive sensor 40 to a magnetic field in the range of 10-50 G (such as at point a in FIG. 6A), and the magnetically conducting ferrous target 36 creates local magnetic field concentrations in the range of 100-200 G proximate sensor 40 at its longitudinal location along the sensor body (such as at point b in FIG. 6A).

Preferably the first coupling hub member 32 has an outer circumference perimeter 42 and the first coupling hub member magnetic target 36 comprises a magnetic ring 44 proximate the first coupling hub member outer circumference perimeter and the second coupling hub member 34 has an outer circumference perimeter 42 and the second coupling hub member magnetic target 36 comprises a magnetic ring 44 proximate the second coupling hub member outer circumference perimeter. Preferably the first magnetostrictive sensor 40 extends over the first coupling hub member magnetic ring 44 and the second coupling hub member magnetic ring 44, the second magnetostrictive sensor 40 extends over the first coupling hub member magnetic ring 44 and the second coupling hub member magnetic ring 44, and the third magnetostrictive sensor 40 extends over the first coupling hub member magnetic ring 44 and the second coupling hub member magnetic ring 44. The magnetic ring 44 can be a continuous magnet or segmented magnets. It is desirable to keep the magnetic field around the perimeter of the ring as uniform as possible and it is preferred to minimize the number of segments and minimize any gap between segments. Such gaps can be reduced by using scarf-cut ends on the magnets (magnets cut at 45° on the ends and butted against one another during installation into the ring on the hub). In an embodiment the magnetic ring rotating member sensor target is the rotating coupling hub member itself, preferably with such rotating member sensor target coupling hubs being ferrous. In an embodiment the magnetic ring rotating member sensor target is the rotating coupling hub member itself, preferably with such rotating member sensor target coupling hubs being magnetic. The coupling hub members can be non-ferrous with a separate magnetic ring sensor target being combined with a nonmagnetic nonferrous hub member. The magnetic ring is proximate the coupling hub member outer circumference perimeter. In an embodiment the magnetic ring is on the outer perimeter of the hub. In an embodiment the magnetic ring is integrated into the non-ferrous titanium hub proximate the outer perimeter and distal from drive shaft inner axis and not actually on the hub outer circumference perimeter. Preferably the first magnetostrictive sensor 40 is fixed in longitudinally parallel alignment with the second magnetostrictive sensor 40 and the third magnetostrictive sensor 40 is fixed in longitudinally parallel alignment the second magnetostrictive sensor 40, with the third magnetostrictive sensor 40 fixed in longitudinally parallel alignment with the first magnetostrictive sensor 40. The sensors 40 are preferably longitudinally aligned in parallel. In an embodiment the longitudinally aligned sensors 40 are straight. In an embodiment the longitudinally aligned sensors 40 are curved. In a curved sensor embodiment the longitudinally aligned sensors 40 are curved such that the sensors bulge out in the vicinity of the hub members and the ends are radially closer to the drive shafts. With curved sensor embodiments the longitudinally aligned sensors 40 have a curvature that avoids and inhibits physical contact with a rotating shaft system component such as a hub member, a flexible coupling member, a shaft member, or other nearby components. Preferably the first coupling hub member 32 defines a plane, such as Plane 1 of FIG. 5, and the second coupling hub member 34 defines a plane, such as Plane 2 of FIG. 5, with the flexible coupling sensor rigid collar misalignment measuring system 38 noncontactingly measuring with the magnetostrictive sensors 40 a plurality of distances from the first coupling hub member rotating sensor target to the second coupling hub member rotating sensor target to provide a misalignment angle $\theta_{misalignment}$ between the first rotating coupling hub member plane and the second rotating coupling hub member plane. Preferably the flexible coupling sensor rigid collar misalignment measuring system 38 encompassing the flexible coupling 30 is physically separated from the flexible coupling 30 wherein physical mechanical contact between the flexible coupling sensor rigid collar misalignment measuring system 38 and the flexible coupling 30 is inhibited. Preferably flexible coupling 30 couples a first drive shaft 28 to a second drive 28 with the magnetostrictive sensor fingers 40 fixed on annular support members of collar 38 with the sensor fingers 40 in parallel longitudinal alignment with the drive shafts, with such alignment substantially parallel with the drive shafts when the misalignment angle is not zero. In a preferred embodiment the flexible coupling sensor rigid collar 38 is a continuous uninterrupted ring, preferably with the collar comprising a complete circle with sensors 40 at 120 degrees fixed angular distances. In a preferred alternative embodiment the flexible coupling sensor rigid collar 38 is an interrupted ring, such as horseshoe arc cradle, with sensors 40 at fixed angular distances less than 120 degrees.

The invention includes a monitored vehicle propulsion system. The propulsion system 22 comprises an engine 24 and a propeller 26 for producing a propelling motive force. The engine 24 is coupled to propeller 26 such as a lift fan, a rotor, a drive unit, or other mover that produces a thrust or force for propelling and controlling the motion of the vehicle. The engine 24 is coupled to the propeller 26 with a drive shaft 28 and at least one flexible coupling 30. The flexible coupling 30 is comprised of a first coupling hub member 32 and a second coupling hub member 34 with the first coupling hub member flexibly coupled to the second coupling hub member. The flexible coupling 30 provides for the mechanical transfer of motive power from the engine 24 to the propeller 26. The propulsion system includes a flexible coupling sensor rigid annular collar measurement system 38 encompassing the flexible coupling 30 with the flexible coupling sensor rigid collar measurement system comprised of a first electromagnetic EM sensor 40, a second electromagnetic EM sensor 40, and a third electromagnetic EM sensor 40, with the first sensor, the second sensor, and the third sensor angularly spaced and rigidly fixed around the collar wherein the sensor rigid collar system 38 monitors the flexible coupling and provides for a noncontact electromagnetic measuring of multiple positional characteristics of the first coupling hub member 32 and the second coupling hub member 34 which relate to the transfer of motive power from the engine to the propeller. Preferably, the EM sensors 40 are magnetostrictive sensors. Sensors 40 are rigidly fixed around collar 38 with first sensor 40 fixed a first fixed angular distance from second sensor 40 and the third sensor 40 fixed a second fixed angular distance from the second sensor 40. Preferably the first, second, and third sensors 40 are equally spaced apart with the first fixed angular distance equal to the second fixed angular distance. In a preferred embodiment the fixed angular distances spacing of sensors 40 is in the range of 60° to 120°. Preferably, sensor rigid collar measuring system 38 has at least three sensors 40. In a preferred embodiment system 38 has four sensors 40. In a preferred embodiment rigid collar measuring system 38 has five sensors 40. Preferably rigid collar measuring system 38 has "n" sensors with n≧3 and the "n" sensors separated by a fixed angular distance Øn with Øn≧90°/(n−1), more preferably Øn≧120°/(n−1). In a preferred embodiment angular distance spacing is in the range of 60-120 degrees, preferably 70-120, more preferably 80-120. In a preferred embodiment the angular distance spacing is about 80 (80±10) degrees. In a preferred embodiment the angular distance spacing is about 90 (90∓10) degrees. In a preferred embodiment the angular distance spacing is about 120 degrees.

The invention includes a method of monitoring a vehicular propulsion system. The method includes monitoring a vehicular propulsion system 22 having a drive shaft flexible coupling 30. The method includes providing a vehicular propulsion system drive shaft flexible coupling 30 with a first coupling hub member 32 with an electromagnetic sensor target and a second coupling hub member 34 with an electromagnetic sensor target and providing a flexible coupling sensor rigid annular collar measurement system 38 with a first electromagnetic sensor 40, a second electromagnetic sensor 40, and a third electromagnetic sensor 40. The method includes encompassing the first coupling hub member sensor target 36 and the second coupling hub member sensor target 36 with the flexible coupling sensor rigid annular collar measurement system 38 while inhibiting a physical contact between the flexible coupling sensor rigid annular collar measurement system and the vehicular propulsion system drive shaft flexible coupling with the first sensor 40, the second sensor 40, and the third sensor 40 angularly spaced around the flexible coupling 30. The method includes noncontactingly measuring multiple positional characteristics of the first coupling hub member 32 and the second coupling hub member 34 to monitor performance of the vehicular propulsion system drive shaft flexible coupling that relates to the transfer of motive power through the vehicular propulsion system drive shaft flexible coupling 30. Sensors 40 are rigidly fixed around the collar of rigid annular collar measurement system 38 with first sensor 40 fixed a first fixed angular distance from second sensor 40 and the third sensor 40 fixed a second fixed angular distance from the second sensor 40. Preferably the first, second, and third sensors 40 are equally spaced apart with the first fixed angular distance equal to the second fixed angular distance. In a preferred embodiment the fixed angular distances spacing of sensors 40 is in the range of 60° to 120°. Preferably, sensor rigid collar measuring system 38 has at least three sensors 40. In a preferred embodiment system 38 has four sensors 40. In a preferred embodiment rigid collar measuring system 38 has five sensors 40. Preferably rigid collar measuring system 38 has "n" sensors with n≧3 and the "n" sensors separated by a fixed angular distance Øn with Øn≧90°/(n−1), more preferably Øn≧120°/(n−1). In a preferred embodiment angular distance spacing is in the range of 60-120 degrees, preferably 70-120, more preferably 80-120. In a preferred embodiment the angular distance spacing is about 80 (80±10) degrees. In a preferred embodiment the angular distance spacing is about 90 (90±10) degrees. In a preferred embodiment the angular distance spacing is about 120 degrees. In an embodiment the first coupling hub member and the second coupling hub member are magnetic. In an embodiment the first coupling hub member and the second coupling hub member are ferrous. In an embodiment the electromagnetic sensor targets are ferrous target rings attached to the coupling hub members. In an embodiment the electromagnetic sensor targets are magnetic target rings attached to the coupling hub members. Preferably the first coupling hub member 32 has an outer circumference perimeter and the first coupling hub member sensor target 36 is a magnetic ring proximate the first coupling hub member outer circumference perimeter, the second coupling hub member 34 has an outer circumference perimeter and the second coupling hub member sensor target is a magnetic ring proximate the second coupling hub member outer circumference perimeter, with the first, second, and third sensors 40 comprising magnetostrictive sensors that extend over the first coupling hub member magnetic ring sensor target and the second coupling hub member magnetic ring sensor target, and noncontactingly measuring includes magnetostrictively sensing distances from the first coupling hub member magnetic ring target to the second coupling hub member magnetic ring target. Noncontactingly measuring preferably includes magnetostrictively measuring the position of the first coupling hub member sensor target and the second coupling hub member sensor target, preferably with the first magnetostrictive sensor, the second magnetostrictive sensor, and the third magnetostrictive sensor fixed in parallel longitudinal alignment. Preferably the first coupling hub member defines a plane and the second coupling hub member defines a plane, and noncontactingly measuring includes magnetostrictively measuring a plurality of distances from the first coupling hub member to the second coupling hub member to provide a misalignment angle $\theta_{misalignment}$ between the first coupling hub member plane and the second coupling hub member plane. In a preferred embodiment of the method the sensors are magnetostrictive sensors fixed in parallel alignment with the second magnetostrictive sensor and the third magnetostrictive sensor fixed in parallel alignment, and measuring the rotating shaft coupling includes magnetostrictively measuring a plurality of distances from the first coupling hub member sensor target to the second coupling hub member sensor target, and transforming the magnetostrictively measured distances into an angular misalignment angle and an axial displacement distance between the first coupling hub and the second coupling hub member.

The invention includes a method of monitoring a drive shaft coupling. The method includes providing a drive shaft coupling 30 with a first coupling hub member 32 with an electromagnetic EM sensor target and a second coupling hub member 34 with an electromagnetic EM sensor target, providing a coupling sensor rigid annular collar measurement system 38 with a first electromagnetic EM sensor 40, a second sensor 40, and a third sensor 40, and encompassing the first coupling hub member sensor target and the second coupling hub member sensor target with the coupling sensor rigid collar measurement system 38 while inhibiting a physical contact between the coupling sensor rigid collar measurement system and the rotating drive shaft coupling, with the first, second, and third sensors angularly spaced externally around the coupling. The method includes noncontactingly electromagnetically measuring a plurality of positional characteristics of the first coupling hub member and the second coupling hub member to monitor a performance of the drive shaft coupling which relates to the transfer of motive power through the drive shaft coupling. Sensors 40 are rigidly fixed around the collar of rigid annular collar measurement system 38 with first sensor 40 fixed a first fixed angular distance from second sensor 40 and the third sensor 40 fixed a second fixed angular distance from the second sensor 40. Preferably the first, second, and third sensors 40 are equally spaced apart with the first fixed angular distance equal to the second fixed angular distance. In a preferred embodiment the fixed angular distances spacing of sensors 40 is in the range of 60° to 120°. Preferably, sensor rigid collar measuring system 38 has at least three sensors 40. In a preferred embodiment system 38 has four sensors 40. In a preferred embodiment rigid collar measuring system 38 has five sensors 40. Preferably rigid collar measuring system 38 has "n" sensors with $n \geqq 3$ and the "n" sensors separated by a fixed angular distance $\emptyset n$ with $\emptyset n \geqq 90°/(n-1)$, more preferably $\emptyset n \geqq 120°/(n-1)$. In a preferred embodiment angular distance spacing is in the range of 60-120 degrees, preferably 70-120, more preferably 80-120. In a preferred embodiment the angular distance spacing is about 80 (80±10) degrees. In a preferred embodiment the angular distance spacing is about 90 (90±10) degrees. In a preferred embodiment the angular distance spacing is about 120 degrees. In an embodiment the first coupling hub member and the second coupling hub member are magnetic. In an embodiment the first coupling hub member and the second coupling hub member are ferrous. In an embodiment the electromagnetic (EM) sensor targets are ferrous target rings attached to the coupling hub members. In an embodiment the electromagnetic (EM) sensor targets are magnetic target rings attached to the coupling hub members. Preferably the first coupling hub member 32 has an outer circumference perimeter and the first coupling hub member sensor target 36 is a magnetic ring proximate the first coupling hub member outer circumference perimeter, the second coupling hub member 34 has an outer circumference perimeter and the second coupling hub member sensor target is a magnetic ring proximate the second coupling hub member outer circumference perimeter, with the first, second, and third magnetostrictive sensors 40 extending over the first coupling hub member magnetic ring sensor target and the second coupling hub member magnetic ring sensor target, and noncontactingly measuring includes magnetostrictively sensing distances from the first coupling hub member magnetic ring target to the second coupling hub member magnetic ring target. Noncontactingly measuring preferably includes magnetostrictively measuring the position of the first coupling hub member sensor target and the second coupling hub member sensor target, preferably with the first magnetostrictive sensor, the second magnetostrictive sensor, and the third magnetostrictive sensor fixed in parallel longitudinal alignment. Preferably the first coupling hub member defines a plane and the second coupling hub member defines a plane, and noncontactingly measuring includes magnetostrictively measuring a plurality of distances from the first coupling hub member to the second coupling hub member to provide a misalignment angle $\theta_{misalignment}$ between the first coupling hub member plane and the second coupling hub member plane. Preferably the method includes measuring a plurality of distances from the first coupling hub member to the second coupling hub member with the sensors and transforming the plurality of measured distances into an angular misalignment angle and an axial displacement distance between the rotating shaft coupling hub members.

The invention includes a method of monitoring a flexible coupling drive shaft system with rotating members. The method includes providing a drive shaft coupling system with a first rotating member 32 with an electromagnetic EM sensor target and a second rotating member 34 with a electromagnetic EM sensor target, providing a sensor rigid collar measurement system 38 with a first electromagnetic EM sensor 40, a second sensor 40, and a third sensor 40, encompassing the first rotating member sensor target and the second rotating member sensor target with the sensor rigid collar measurement system while inhibiting a physical contact between the sensor rigid collar measurement system and the rotating members, with the first, second, and the third sensors angularly spaced around the first rotating member and the second rotating member, and noncontactingly measuring a plurality of rotating positional characteristics of the first rotating member 32 and the second rotating member 34 to monitor a performance of the drive shaft system which relates to a transfer of motive power through the drive shaft system, and then providing for a correction change in the drive shaft system when a measured rotating positional characteristic performance of the drive shaft system exceeds a measured rotating positional characteristic performance limitation. When the sensor rigid collar measurement system 38 measures a rotating positional characteristic performance exceeding a performance limitation then proper corrective action is initiated. In an embodiment, when the sensor rigid collar measurement system 38 measures a rotating positional characteristic performance of coupling 30 with the misalignment angle $\theta_{misalignment}$ between the first rotating coupling hub member and the second rotating coupling hub member exceeding a misalignment angle limitation, use of the flexible coupling 30 in the drive shaft propulsion system 22 is limited until the coupling 30 is replaced or other corrective action is taken to correct the exceeding of the misalignment angle performance limitation. The flexible coupling drive shaft monitoring system and method provides for a correction in the drive shaft system, correction or replacement of a system element, and checking the drive shaft system for operational problems.

The invention includes a method of monitoring a drive shaft system. The method includes providing a drive shaft system 28 with a first rotating member 32 with a magnetic sensor target 36 and providing a sensor rigid measurement system 38 with a magnetostrictive sensor 40 proximate the first rotating member sensor target 36 while inhibiting a physical contact between the measurement system magnetostrictive sensor 40 and the rotating member 32, magnetostrictively measuring a rotating positional characteristic of the first rotating member 32 to monitor a performance of the drive shaft system 28. The method includes providing a shaft system with at least a first rotating member with a magnetic sensor target, providing a sensor rigid measurement system with at least a first magnetostrictive sensor proximate to and external from the first rotating member sensor target while inhibiting a physical contact between the measurement system magnetostrictive sensor and the rotating member, and magnetostrictively measuring a dynamic rotating positional characteristic of the rotating member to dynamically monitor a performance of the rotating shaft system.

The invention includes a method of measuring a rotating shaft. The method includes providing a shaft with a first rotating member with a magnetic sensor target and providing a sensor measurement system with a magnetostrictive sensor proximate the first rotating member sensor target while inhibiting a physical contact between the measurement system magnetostrictive sensor and the rotating member, and magnetostrictively measuring a rotating positional characteristic of the first rotating member to dynamically measure the rotating shaft. Preferably the method includes measuring a plurality of distances along the shaft that relate to the sensed magnetic sensor target rotating member and transforming the plurality of measured distances to provide an angular misalignment angle for the rotating shaft. Preferably the method includes measuring a plurality of distances along the shaft that relate to the sensed magnetic sensor target rotating member and transforming the plurality of measured distances to provide an axial displacement distance for the rotating shaft. The invention includes a dynamic method of measuring a rotating shaft. The method includes providing a shaft with a first rotating member with a sensor target and a second rotating member with a sensor target, preferably with the sensor targets magnetic. Preferably the rotating member sensor targets are disks, preferably magnetic sensor target disks. The method includes providing a sensor measurement system with at least a first sensor proximate the first rotating member sensor target and the second rotating member sensor target, and measuring a plurality of distances from the first rotating member sensor target to the second rotating member sensor target and transforming these measured distances into a dynamic rotating positional characteristic of the rotating shaft. Preferably the at least first sensor proximate the first rotating member sensor target and the second rotating member sensor target is a magnetostrictive sensor, preferably with the at least first magnetostrictive sensor external from the magnetic sensor target. Preferably transforming the plurality of measured distances into a dynamic rotating positional characteristic of the rotating shaft includes transforming the plurality of measured distances into an axial displacement distance of the rotating shaft. Preferably transforming the plurality of measured distances into a dynamic rotating positional characteristic of the rotating shaft includes transforming the plurality of measured distances into an angular misalignment angle of the rotating shaft. Preferably measuring the plurality of distances from the first rotating member sensor target to the second rotating member sensor target includes magnetically detecting the first rotating member sensor target and the second rotating member sensor target. Preferably measuring the plurality of distances from the first rotating member sensor target to the second rotating member sensor target includes magnetostrictively sensing the targets, preferably with a plurality of magnetostrictive sensors positioned proximate and external from the first rotating member sensor target and the second rotating member sensor target.

The invention includes a rotating shaft measurement system for noncontactingly monitoring a rotating member 32 including a magnetic sensor target 36, with the rotating shaft measurement system including a sensor rigid collar 38 comprised of a first magnetostrictive sensor 40. The first magnetostrictive sensor 40 is rigidly fixed on the sensor rigid collar proximate the rotating member 32, wherein the sensor rigid collar measurement system first magnetostrictive sensor 40 noncontactingly magnetostrictively monitors a position of the rotating member sensor target 36 to provide a measurement of a rotating positional characteristic of the first rotating member 32 to monitor a performance of the rotating member.

The invention includes a shaft coupling measurement system for noncontactingly monitoring a flexible coupling. The shaft coupling measurement system 38 is for measurement of a flexible coupling 30 with a first coupling hub member 32 including an magnetic target and a second coupling hub member 34 including an magnetic target, with the first coupling hub member flexibly coupled to the second coupling hub member. The flexible coupling sensor rigid collar misalignment measuring system 38 encompasses the flexible coupling 30 with a first EM magnetostrictive sensor 40, a second EM magnetostrictive sensor 40, and a third EM magnetostrictive sensor 40 rigidly fixed around the system collar, with the first sensor 40 fixed a first fixed angular distance from the second sensor 40, and the third sensor 40 fixed a second fixed angular distance from the second sensor 40. The flexible coupling sensor rigid collar misalignment measuring system magnetostrictive sensors 40 noncontactingly monitor a position of the first coupling hub member 32 relative to a position of the second coupling hub member 34 to provide a misalignment measurement of the flexible coupling which relates to a performance of the coupling 30. The first coupling hub member 32 has an outer circumference perimeter and the first coupling hub member target is a magnetic ring proximate the first coupling hub member outer circumference perimeter, and the second coupling hub member 34 has an outer circumference perimeter and the second coupling hub member target is a magnetic ring proximate the second coupling hub member outer circumference perimeter. The first magnetostrictive sensor 40 extends over the first coupling hub member magnetic ring and the second coupling hub member magnetic ring, the second magnetostrictive sensor 40 extends over the first coupling hub member magnetic ring and the second coupling hub member magnetic ring, and the third magnetostrictive sensor 40 extends over the first coupling hub member magnetic ring and the second coupling hub member magnetic ring. The first magnetostrictive sensor 40 is fixed in parallel alignment with the second magnetostrictive sensor 40 and the third magnetostrictive sensor 40. Preferably the first coupling hub member 32 defines a plane and the second coupling hub member 34 defines a plane with the flexible coupling sensor rigid collar misalignment measuring system 38 noncontactingly measuring a plurality of positional distances of the first coupling hub member magnetic ring and the second coupling hub member magnetic ring along the longitudinal length of the magnetostrictive sensors 40 to provide a misalignment angle $\theta_{misalignment}$ between the first coupling hub member plane and the second coupling hub member plane. The flexible coupling sensor rigid collar misalignment measuring system provides for measurement of the position of the first target relative to the sensors and for measurement of the position of the second target relative to the sensors. The flexible coupling sensor rigid collar misalignment measuring system can provide for an absolute measurement of the target positions and for the relative measurement of the target positions. The flexible coupling sensor rigid collar misalignment measuring system 38 encompassing the flexible coupling 30 is physically separated from the flexible coupling with physical mechanical contact between the flexible coupling sensor rigid collar misalignment measuring system and the flexible coupling inhibited. Preferably the flexible coupling 30 couples a first drive shaft 28 to a second drive 28 with the magnetostrictive sensor fingers 40 fixed on an annular support members with the sensors 40 in parallel alignment with the drive shafts when the misalignment angle of the drive shafts is zero and in substantially parallel alignment with the drive shafts when the misalignment angle of the drive shafts is not zero. In an embodiment flexible coupling sensor rigid collar 38 is a continuous uninterrupted ring with sensors 40 at 120 degree fixed angular distances. In an embodiment flexible coupling sensor rigid collar 38 is an interrupted ring, such as a horseshoe arc cradle.

Preferably coupling sensor rigid collar misalignment measuring system 38 includes at least three magnetostrictive linear sensors 40. Magnetostrictive sensors 40 are used to measure the axial displacement of coupling 30 and the target locations of coupling hub members 32,34 of shaft coupling 30. With coupling sensor rigid collar measuring system 38, axial motion is measured at three locations around the outside of the magnetic ring target 36 placed on each side of the coupling 30. Each set of three positions is used to determine a plane normal to the axis of rotation on each side. This is used to determine the angular alignment each coupling 30 is exposed to. Magnetostrictive sensors 40 measure multiple magnetic targets 36 along the axis of the sensor 40. The three magnetostrictive sensors 40 are used to determine the 6 points needed to calculate this angular alignment. In the magnetostrictive position sensor 40, a pulse is induced in the magnetostrictive waveguide sensor body by the momentary interaction of two magnetic fields. One field comes from the rotating member movable magnet target 36 which passes along the outside of the magnetostrictive sensor tube, and the other field comes from a current interrogation pulse launched along the waveguide sensor body. The interaction between the two magnetic fields produces a strain pulse, which travels at sonic speed along the waveguide until the pulse is detected at the head of the sensor. The position of the magnetic target 36 is precisely determined by measuring the elapsed time between the launching of the electronic interrogation pulse and the arrival of the strain pulse to provide accurate non-contact position sensing of coupling hub members 32,34 of shaft coupling 30 while inhibiting contact between the sensor components 40 of coupling sensor rigid collar measuring system 38 and rotating shaft coupling 30.

The coupling sensor rigid collar measuring system assembly includes three or more magnetostrictive sensors 40 mounted around two magnetic rings 44 which are assembled on each side of a flexible coupling 30. Each sensor 40 measures the distance from the sensor base to each magnetic ring. Each sensor is fixed to collar support members of sensor rigid collar misalignment measuring system 38. As shown in FIG. 3, the coupling hub members 32,34 are fixed to the ends of shaft members 28.

Figure 5:
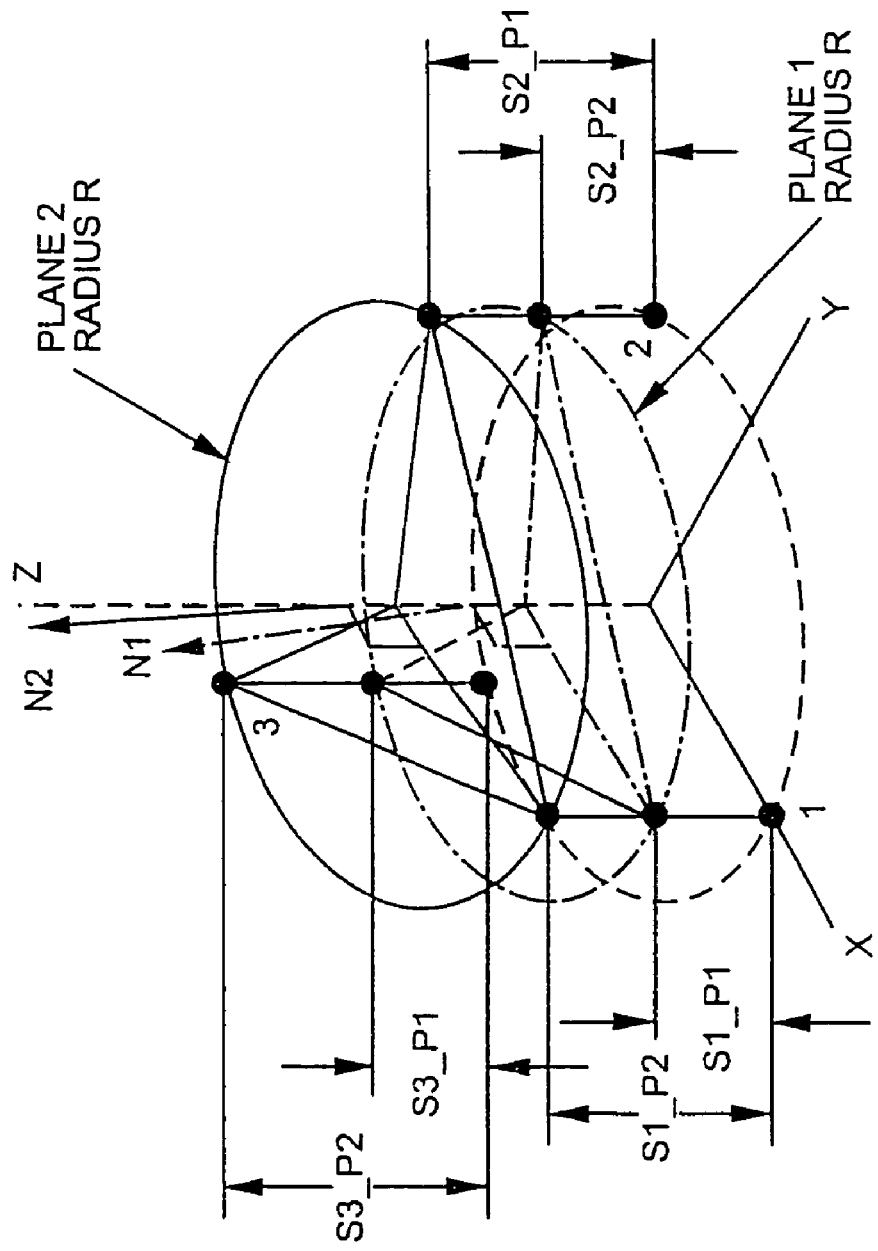
FIG. 5 shows an embodiment of the invention.
Figure 6A:
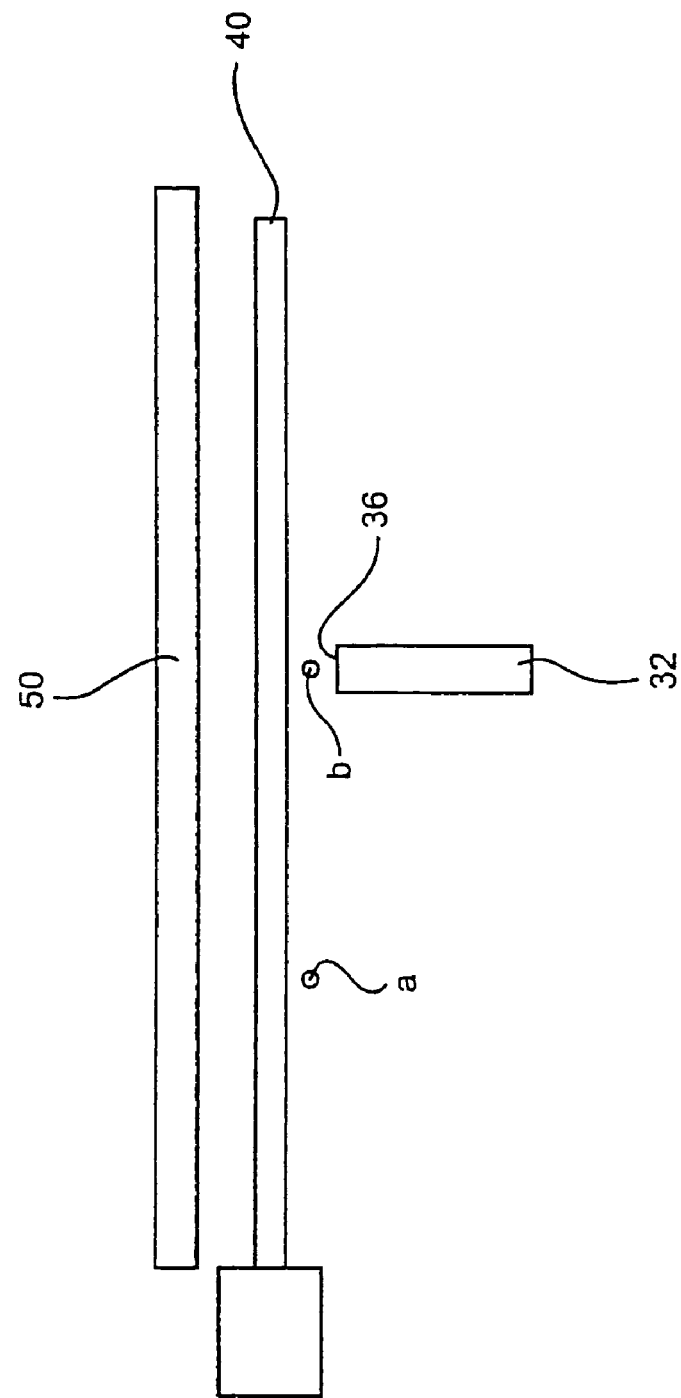
FIG. 6A-D show and embodiment of the invention.
Figure 6C:
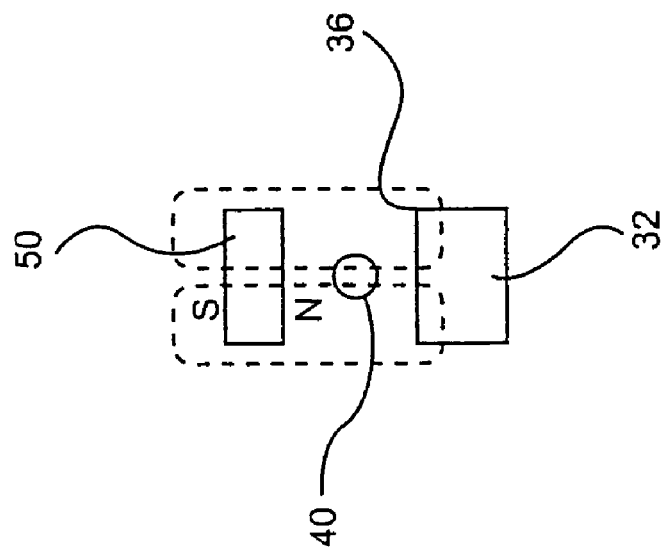
Figure 6B:
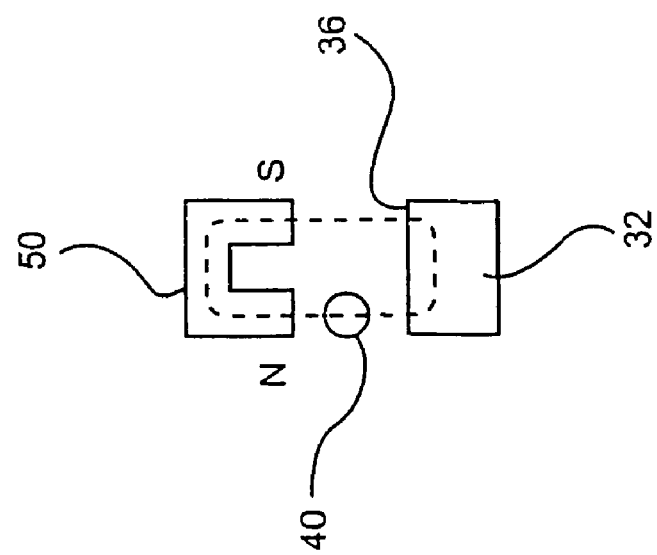
Figure 6D:
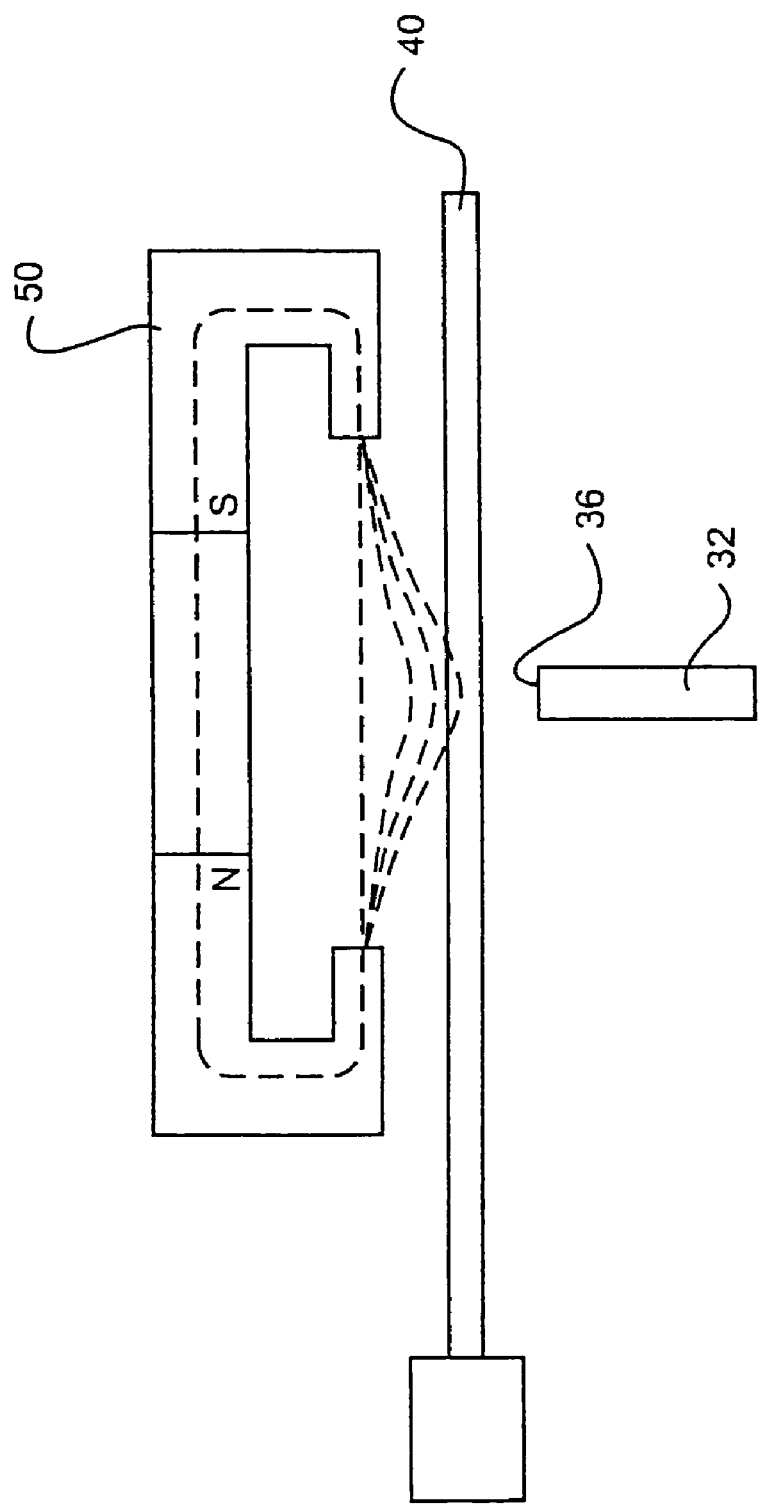
Figure 7A:
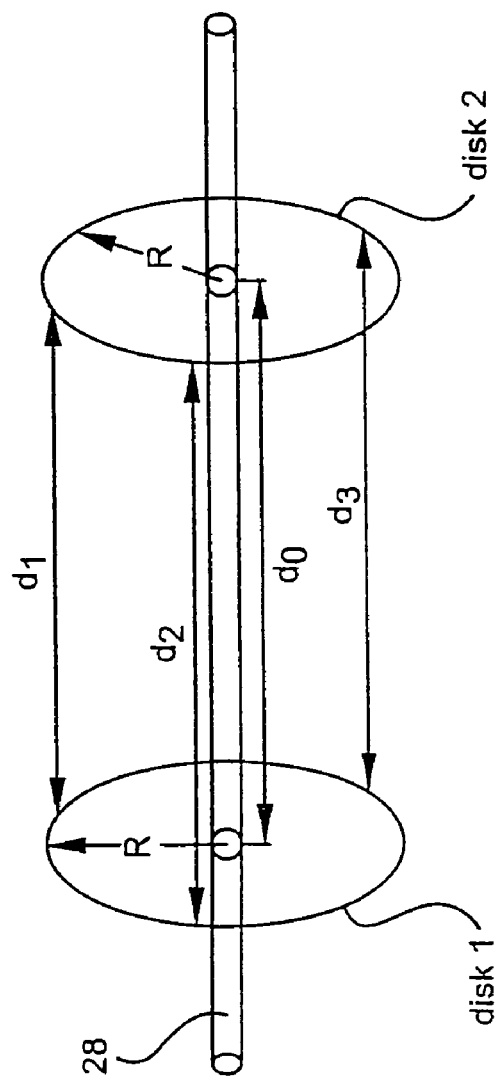
FIG. 7A-C show an embodiment of the invention.
Figure 7A:
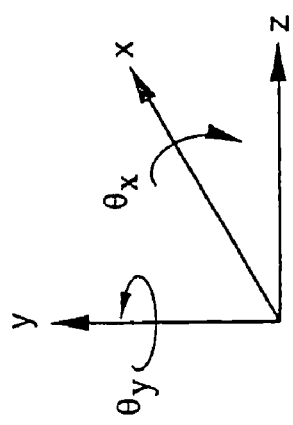
Figure 7B:
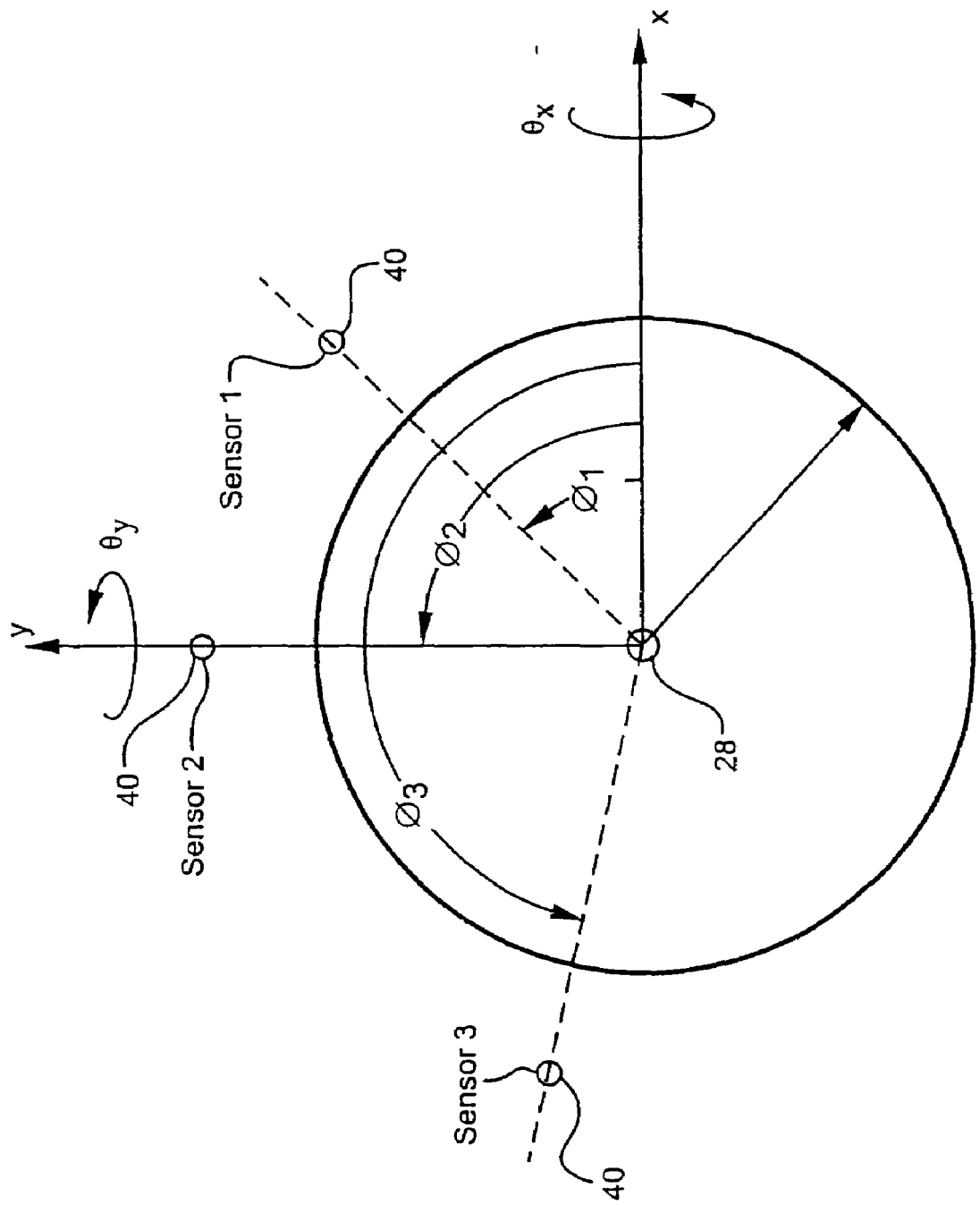
Figure 7C:
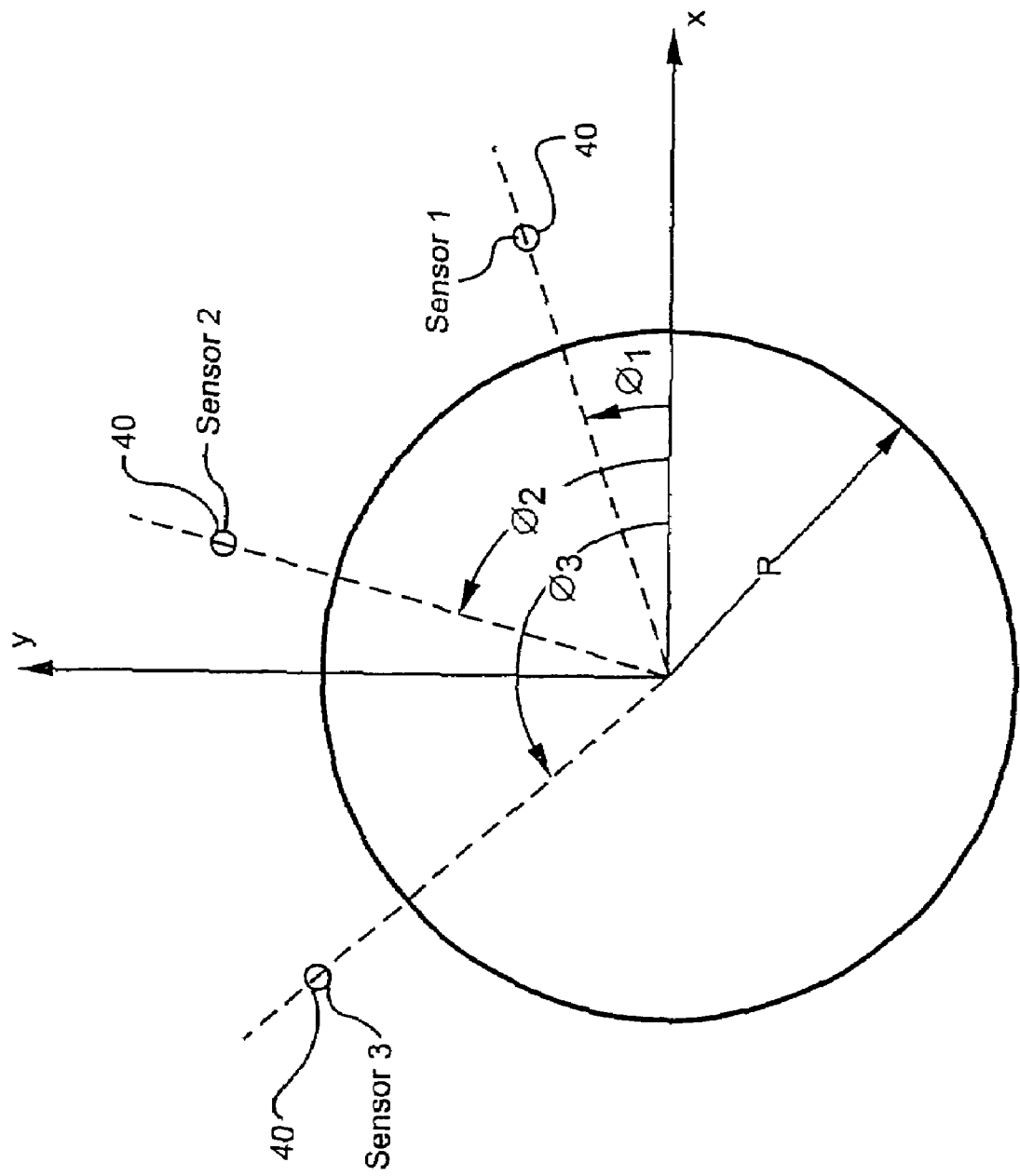

To determine the angular misalignment in-between the two shafts members 28, the three sensors 40 are fixed to each other in a known reference plane. The three sensors define a plane, with the sensors fixed between the rigid collar arched frame of coupling sensor rigid collar misalignment measurement system 38 and thereby define an arbitrary plane. From this arbitrary plane, the plane of each side of the coupling 30 can be determined using the magnetic field produced by the hub member sensor target magnets 44. The arbitrary and coupling planes are then subtracted to determine the degree of misalignment of the shaft members 28. The following derivation utilizing the system illustrated in FIG. 5 shows the angular misalignment calculation from an arbitrary reference plane.

Define Points on the First Plane
Plane 1, point 1=(R, 0, S1_P1)
Plane 1, point 2=(R*cos(120), R*sin(120), S2_P1)
Plane 1, point 3=(R*cos(120), R*sin(120), S3_P1)

Define Points on the Second Plane
Plane 2, point 1=(R, 0, S1_P2)
Plane 2, point 2=(R*cos(120), R*sin(120), S2_P2)
Plane 2, point 3=(R*cos(120), R*sin(120), S3_P2)

Define Two Lines on Plane 1
L_P1_12=(R*cos(120)−R, R*sin(120), S2_P1−S1_P1)
L_P1_13=(R*cos(240)−R, R*sin(240), S3_P1−S1_P1)

Define Two Lines on Plan 2
L_P2_12=(R*cos(120)−R, R*sin(120), S2_P2−S1_P2)
L_P2_13=(R*cos(240)−R, R*sin(240), S3_P2−S1_P2)

Define Normal Vectors
N1=(L_P1_12×L_P1_13)
N2=(L_P2_12×L_P2_13)

Let $\theta_{misalignment}$ be the Misalignment angle between the two planes $$\cos(\theta_{misalignment}) = \frac{N1 \cdot N2}{\|N1\| * \|N2\|}$$

The $\theta_{misalignment}$ is solvable regardless what the angle of each disk to each of the axis plane of the sensor bracket.

FIG. 2 shows the magnetostrictive misalignment system 38 on a drive shaft 28. The shaft 28 has a flexible coupling 30 at each end, where it is desired to measure the misalignment seen by each coupling. The coupling sensor rigid collar misalignment measuring system collar 38 with a plurality of sensor fingers spaced equally around the collar enshrouds the opposed shaft ends. The magnetostrictive sensors 40 preferably are embedded in the collar frame structure fingers which extend proximate the coupling members 32,34. The wiring and electronics for coupling sensor rigid collar misalignment measuring system are preferably integrated into the bracket. Additionally, the sensors preferably include sensing means suitable to locate the sensing means along the periphery of and proximate the coupling member.

FIG. 2 shows an integrated sensor bracket system installed around a coupling 30. This bracket incorporates three magnetostrictive sensors 40 into a collar bracket which is installed over the shaft. The magnetic rings are located radially inwardly of the sensor fingers of misalignment system 38. These rotating member rings are made of magnetic material in a continuous pole configuration such that the magnetic fields produced by the rings are sensed by the magnetostrictive sensors 40 of the integrated sensor bracket system. The sensor electronics can be integrated into the bracket housing and provide a single assembly.

The center of each plane can be determined to calculate the axial distance between each plane. This information is useful in determining if the rotating shaft system coupling is affected by issues of thermal growth.

The invention includes a method of measuring a rotating shaft system. The method can be used to dynamically measure a rotating shaft system with a coupling or without a coupling. The method includes dynamically sensing a plurality of positional distances to provide three measured distances between two sensor targets spaced along the length of the rotating shaft, with the three measured distances angularly separated. The three measured distances are transformed into angular misalignment of the rotating shaft and axial displacement (distance) of the rotating shaft. The method includes providing a shaft 28 with a first rotating member 32 with a sensor target disk 1 and a second rotating member 34 with a sensor target disk 2. As shown in FIG. 7, rotating shaft 28 has a mean distance do between the centers of rotating member sensor disk target 32 (center of disk-1 having a radius R) and rotating member sensor disk target 34 (center of disk-2 having a radius R). Three measured distances $d_1$, $d_2$, $d_3$ between the circumference perimeter of the disks are obtained from three angularly separated sensors 40 (sensor #1, sensor #2, sensor #3) (angular location of the sensors shown in FIG. 7B-7C). The misalignment of the rotating shaft 28 is calculated in the method with the assumption that disk-1 is always perpendicular to the coordinate frame (X Y Z), that disk-2 rotates with respect to XYZ by an amount of $\theta_x$, $\theta_y$, and disk-2 is separated from disk-1 by distance $d_0$ at the shaft. The three measured distances $d_1$, $d_2$, $d_3$ obtained from the sensors 40 are transformed with the following geometric equations and matrix transforms:

$$d_1 = d_o + R\cos(\phi_1)\theta_y + R\sin(\phi_1)\theta_x$$

$$d_2 = d_o + R\cos(\phi_2)\theta_y + R\sin(\phi_2)\theta_x$$

$$d_3 = d_o + R\cos(\phi_3)\theta_y + R\sin(\phi_3)\theta_x$$

$$\begin{Bmatrix} d_1 \\ d_2 \\ d_3 \end{Bmatrix} = \begin{bmatrix} 1 & R\cos(\phi_1) & R\sin(\phi_1) \\ 1 & R\cos(\phi_2) & R\sin(\phi_1) \\ 1 & R\cos(\phi_3) & R\sin(\phi_1) \end{bmatrix} \begin{Bmatrix} d_o \\ \theta_y \\ \theta_x \end{Bmatrix}$$

$$A = \begin{bmatrix} 1 & R\cos(\phi_1) & R\sin(\phi_1) \\ 1 & R\cos(\phi_2) & R\sin(\phi_1) \\ 1 & R\cos(\phi_3) & R\sin(\phi_1) \end{bmatrix}$$

$$\begin{Bmatrix} d_o \\ \theta_y \\ \theta_x \end{Bmatrix} = A^{-1} \begin{Bmatrix} d_1 \\ d_2 \\ d_3 \end{Bmatrix}$$

$$\theta = \sqrt{\theta_x^2 + \theta_y^2}$$

Figure 8:
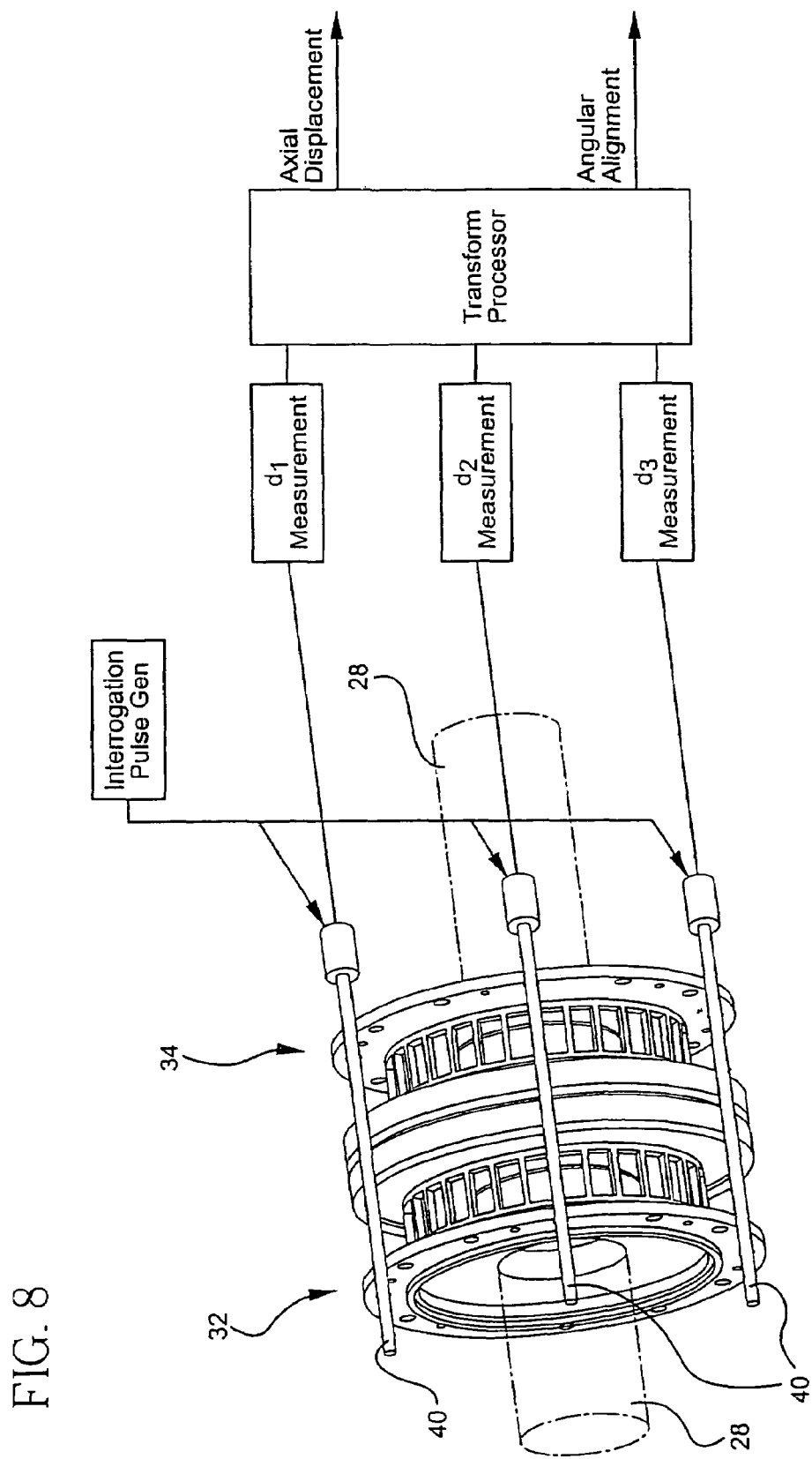
FIG. 8 shows an embodiment of the invention.
Figure 9:
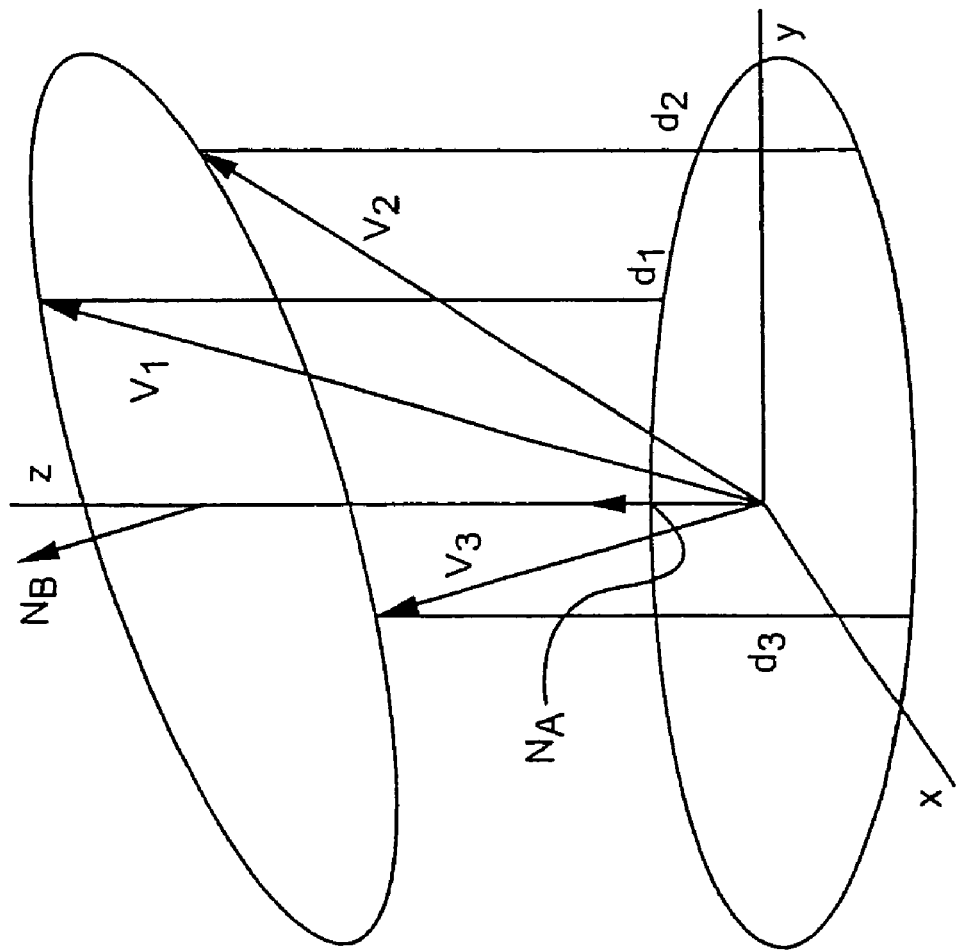
FIG. 9 shows an embodiment of the invention.
Figure 10:
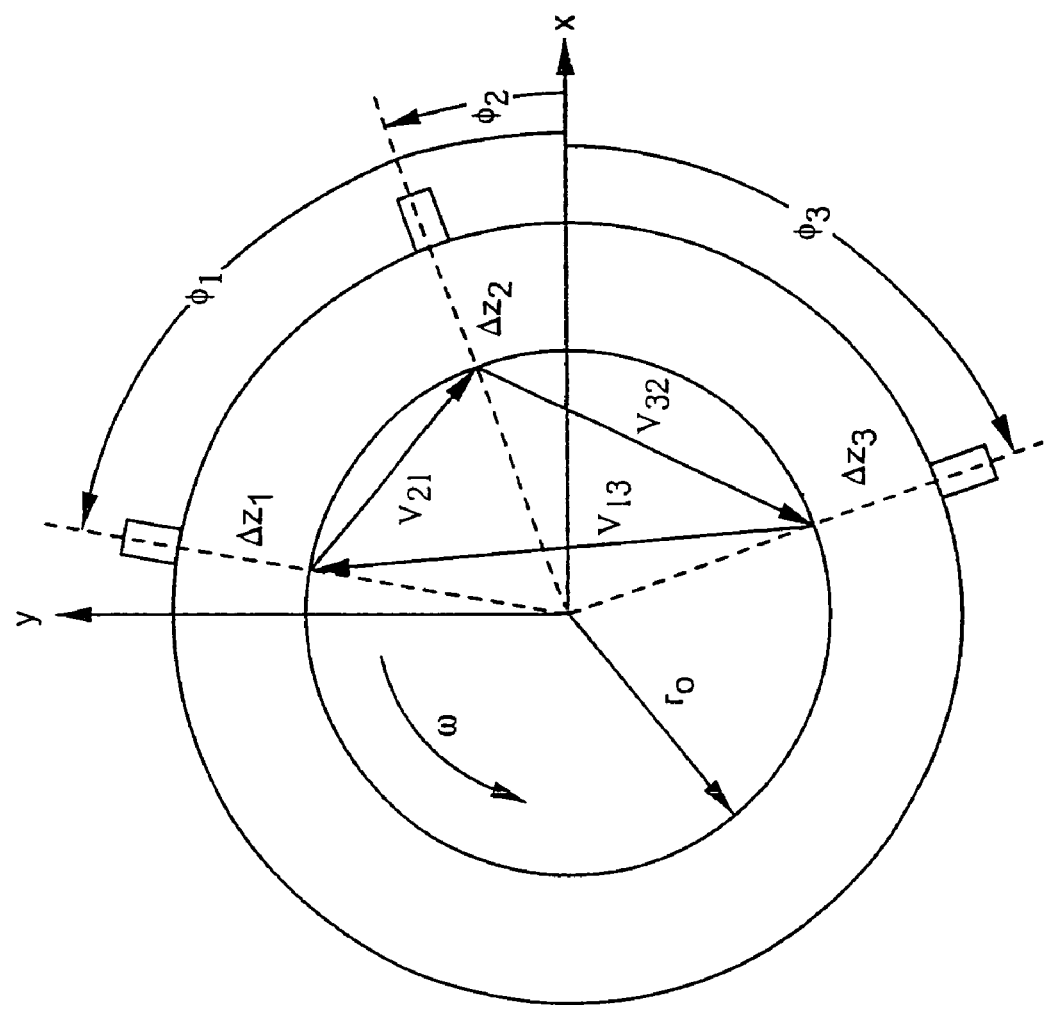
FIG. 10 shows an embodiment of the invention.

Using the A matrix, the three measured distances are transformed to provide the angular misalignment of the rotating shaft and axial displacement distance of the rotating shaft between the rotating members 32, 34. FIG. 8 shows another embodiment with three angularly separated sensors 40 fixed around the rotating shaft's first rotating member 32 sensor target disk and the second rotating member 34 sensor target disk providing three measured distances $d_1$, $d_2$, $d_3$ which are transformed to provide the axial displacement and angular alignment of rotating coupling 30 or rotating shaft 28. As shown in FIG. 9-10 misalignment is computed by measuring the relative displacements $\{d_1, d_2, d_3\}$ between the two disks at three points around the perimeter. These displacements are measured by timing the interval between the target disks, and multiplying this result by the wave speed:

$$d_n \text{ (in)} = c\left(\frac{\text{in}}{\text{sec}}\right) \times \Delta t \text{ (sec)} \quad (1)$$

where n={1, 2, 3} is the sensor number, and c is a known wave speed (for magnetostrictive sensors 40 the known sonic speed of the magnetically induced strain pulse wave in the magnetostrictive sensor waveguide body). For this analysis, it is convenient to assume that one disk is always oriented perfectly in the x-y plane and the other disk is at some angle relative to the x-y plane as shown in FIG. 9 (Vector diagram for locating points on a target disk). The three points at the perimeter of a target disk are represented by vectors in the absolute x-y-z coordinate system. For a general disk, as shown in FIG. 9 these vectors are given by:

$$V_1 = [\Delta x_{AB} + r_o \cos\phi_1]\hat{x} + [\Delta y_{AB} + r_o \sin\phi_1]\hat{y} + [d_1]\hat{z}$$

$$V_2 = [\Delta x_{AB} + r_o \cos\phi_2]\hat{x} + [\Delta y_{AB} + r_o \sin\phi_2]\hat{y} + [d_2]\hat{z}$$

$$V_3 = [\Delta x_{AB} + r_o \cos\phi_3]\hat{x} + [\Delta y_{AB} + r_o \sin\phi_3]\hat{y} + [d_3]\hat{z} \quad (2)$$

where $r_o$ is the nominal radius of the target disk, $\hat{x}$, $\hat{y}$, and $\hat{z}$ are unit vectors in the x-, y-, and z-directions respectively, and $\Delta x_{AB}$ and $\Delta y_{AB}$ are the relative displacements between disk A and disk B in the x- and y-directions respectively. To compute the 5 normal vector for the misaligned disk, we need two vectors residing on the disk itself. FIG. 10 (Vector diagram for computing a normal vector on a target disk) indicates that there are three possibilities available:

$$V_{21} = V_2 - V_1 = r_o[\cos\phi_2 - \cos\phi_1]\hat{x} + r_o[\sin\phi_2 - \sin\phi_1]\hat{y} + [d_2 - d_1]\hat{z}$$

$$V_{32} = V_3 - V_2 = r_o[\cos\phi_3 - \cos\phi_2]\hat{x} + r_o[\sin\phi_3 - \sin\phi_2]\hat{y} + [d_3 - d_2]\hat{z}$$

$$V_{13} = V_1 - V_3 = r_o[\cos\phi_1 - \cos\phi_3]\hat{x} + r_o[\sin\phi_1 - \sin\phi_3]\hat{y} + [d_1 - d_3]\hat{z} \quad (3)$$

The normal vectors for Disk A and B are then computed as:

$$N_A = 0\hat{x} + 0\hat{y} + 1\hat{z})$$

$$N_B = V_{32B} \times V_{21B} = V_{13B} \times V_{32B} = V_{21B} \times V_{13B} \quad (4)$$

Any of the three vector cross-products should give the same answer. Preferably the method takes full advantage of this redundancy (the three vector cross-products giving the same answer) by either averaging them or using the additional measurements to diagnose any potential problems with the system. Finally, the angular deviation $\theta_{alignment}$ between the two normal vectors, representing the primary measure of misalignment, is computed as $$\theta_{alignment} = \cos^{-1}\left(\frac{N_A \cdot N_B}{|N_A||N_B|}\right) \quad (5)$$

Figure 11:
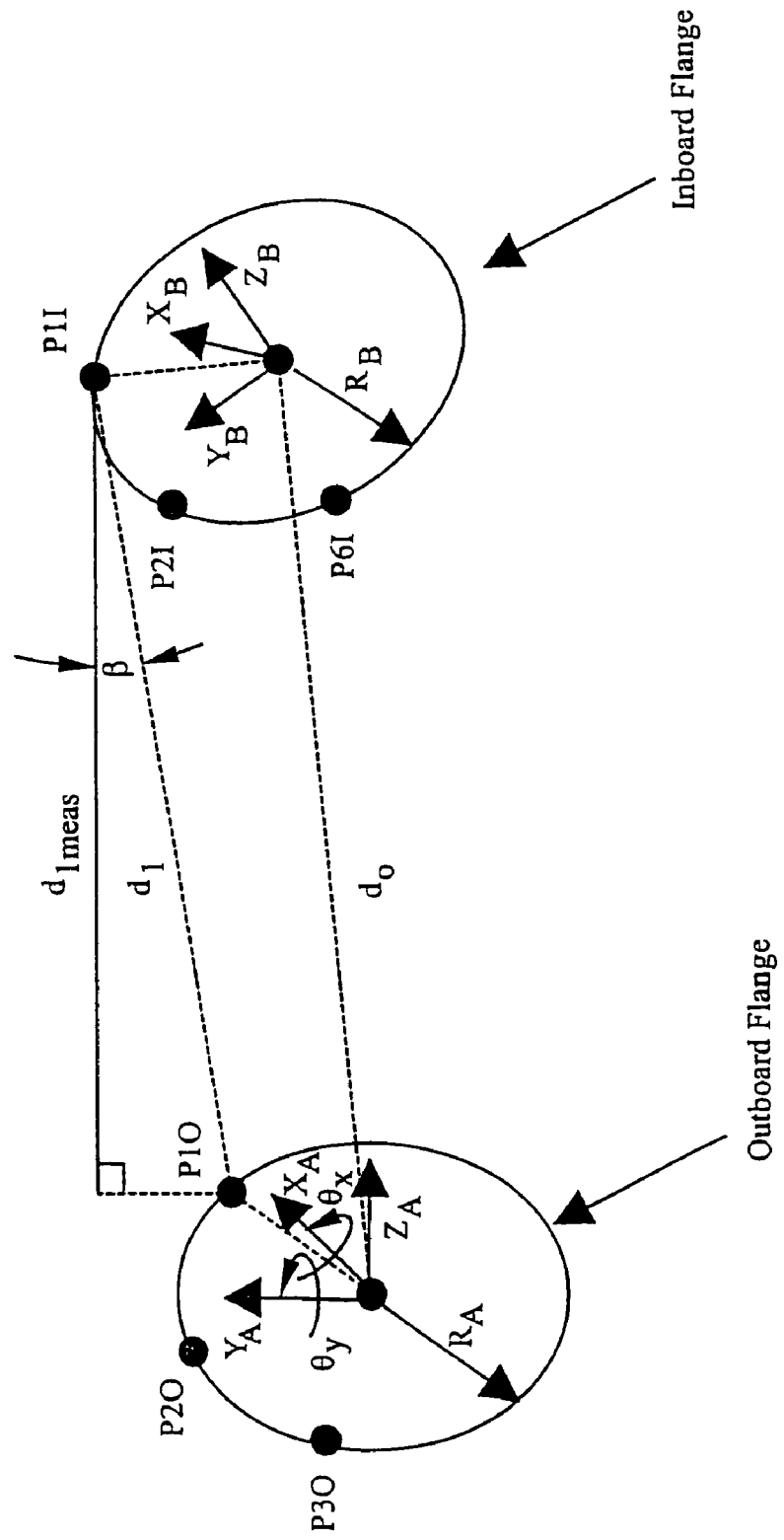
FIG. 11 shows an embodiment of the invention.
Figure 12:
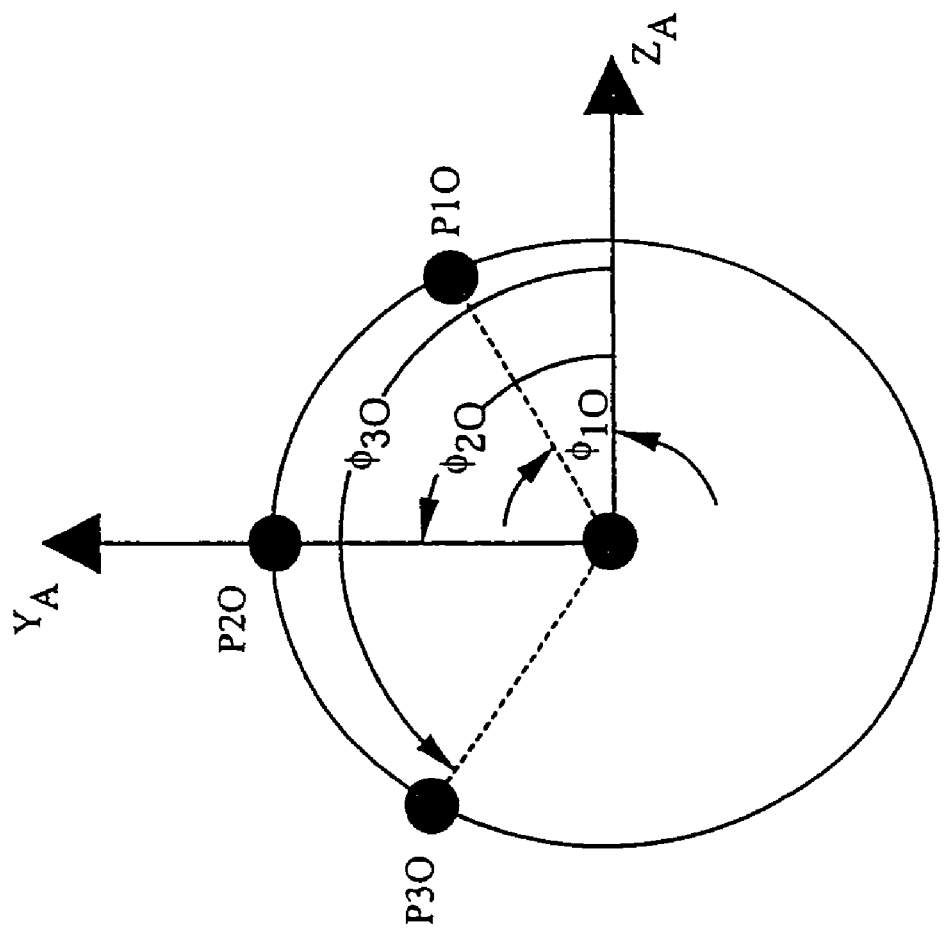
FIG. 12 shows an embodiment of the invention.

FIG. 11-12 show a further method of transforming the three measured distances into the dynamic rotating positional characteristics of the rotating shaft to provide an angular misalignment and an axial displacement. The points P represent the locations on each flange (32,34) of coupling 30 over which the three magnetostrictive sensors 40 lie. Sensor 1 lies over points P1O and P1I, Sensor 2 lies over points P2O and P2I, and Sensor 3 lies over points P3O and P3I. The points are established on each flange at predetermined angles, Φ, as shown in FIG. 12. These represent the fixed angular spacing of the sensors 40 when installed in a cradle frame fixture of coupling sensor rigid collar misalignment measurement system 38. The two flanges (inboard flange and outboard flange) are free to rotate and translate and therefore have unique coordinate systems {A} and {B}. We arbitrarily select coordinate system {A} and proceed to define all points of interest in this coordinate system. Therefore, $$^AP1I = {}_B^A T {}^BP1I = \begin{bmatrix} {}_B^A R & {}^A P_{Borig} \\ 0\ 0\ 0 & 1 \end{bmatrix} \begin{bmatrix} {}^BP1I \\ 1 \end{bmatrix} \quad \text{(Eqn. 1)}$$

in which the transformation matrix T is comprised of both rotational and translational components. The rotation matrix is represented by $$_B^A R = {}_B^A R_{xyz}(\theta_x, \theta_y, \theta_z) = R_z(\theta_z) R_y(\theta_y) R_x(\theta_x)$$

and for this case $\theta_z=0$ so the rotation matrix becomes $$_B^A R = \begin{bmatrix} c\theta_y & 0 & s\theta_y \\ 0 & 1 & 0 \\ -s\theta_y & 0 & c\theta_y \end{bmatrix}\begin{bmatrix} 1 & 0 & 0 \\ 0 & c\theta_x & -s\theta_x \\ 0 & s\theta_x & c\theta_x \end{bmatrix} = \begin{bmatrix} c\theta_y & s\theta_y s\theta_x & s\theta_y c\theta_x \\ 0 & c\theta_x & -s\theta_x \\ -s\theta_y & c\theta_y s\theta_x & c\theta_y c\theta_x \end{bmatrix}.$$

The point on the inboard flange can be explicitly written in the {B} coordinate system:

$$^B P1I = \begin{bmatrix} R_B c\phi_{1I} \\ R_B s\phi_{1I} \\ 0 \end{bmatrix}.$$

Similarly, $$^A P1O = \begin{bmatrix} R_A c\phi_{1O} \\ R_A s\phi_{1O} \\ 0 \end{bmatrix}.$$

We then find $d_1$ using vector math:

$$d_1 = {}^A P1I - {}^A P1O$$

Write Eqn. 1 for points P1, P2, and P3 to solve for $d_0$ (axial displacement) and $\theta_x$ and $\theta_y$. The angular misalignment is then $$\theta = \sqrt{\theta_x^2 + \theta_y^2}$$

Such transforming of a plurality of noncontactingly measured distances from a first rotating coupling hub target and a second rotating coupling hub target of shaft 28 provide for a dynamic monitoring of an angular misalignment angle and an axial displacement distance between first and second rotating target members of a rotating shaft to provide valuable rotating positional characteristics of the shaft and its performance in the rotating shaft system.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

The invention claimed is:

1. A method of monitoring a shaft system, said method comprising providing a shaft system with a rotating member with a magnetic sensor target, providing a sensor rigid measurement system with a magnetostrictive sensor proximate said rotating member sensor target while inhibiting a physical contact between said measurement system magnetostrictive sensor and said rotating member, magnetostrictively measuring a rotating positional characteristic of said rotating member to monitor a performance of said shaft system.

2. A method of measuring a rotating shaft, said method comprising providing a shaft with a rotating member with a sensor target, providing a sensor measurement system with a magnetostrictive sensor proximate said rotating member sensor target while inhibiting a physical contact between said measurement system magnetostrictive sensor and said rotating member, magnetostrictively measuring a rotating positional characteristic of said rotating member to measure said rotating shaft.

3. A method as claimed in claim 2 wherein measuring a rotating positional characteristic of said rotating member to measure said rotating shaft includes measuring a plurality of distances and transforming said plurality of measured distances to provide an angular misalignment angle.

4. A method as claimed in claim 2 wherein measuring a rotating positional characteristic of said rotating member to measure said rotating shaft includes measuring a plurality of distances and transforming said plurality of measured distances to provide an axial displacement distance.

5. A method of measuring a rotating shaft, said method comprising providing a shaft with a first rotating member with a sensor target and a second rotating member with a sensor target, providing a sensor measurement system with at least a first magnetostrictive sensor proximate said first rotating member sensor target and said second rotating member sensor target and measuring a plurality of distances of said first rotating member sensor target and said second rotating member sensor target and transforming said plurality of measured distances into a dynamic rotating positional characteristic of said rotating shaft.

6. A method as claimed in claim 5, wherein transforming said plurality of measured distances into a dynamic rotating positional characteristic of said rotating shaft includes transforming said plurality of measured distances into an axial displacement distance.

7. A method as claimed in claim 5, wherein transforming said plurality of measured distances into a dynamic rotating positional characteristic of said rotating shaft includes transforming said plurality of measured distances into an angular misalignment angle.

8. A method as claimed in claim 5 wherein said first rotating member sensor target is a disk and said second rotating member sensor target is a disk.

9. A method as claimed in claim 5 wherein measuring a plurality of distances of said first rotating member sensor target and said second rotating member sensor target includes magnetostrictively detecting said first rotating member sensor target and said second rotating member sensor target.

10. A method as claimed in claim 5 wherein measuring a plurality of distances of said first rotating member sensor target and said second rotating member sensor target includes magnetostrictively sensing said targets.

11. A method as claimed in claim 5 wherein measuring a plurality of distances of said first rotating member sensor target and said second rotating member sensor target includes magnetostrictively sensing said targets with a plurality of magnetostrictive sensors positioned proximate and external from said first rotating member sensor target and said second rotating member sensor target.

12. A rotating shaft measurement system for noncontactingly monitoring a rotating member including a sensor target, said rotating shaft measurement system including a sensor rigid collar comprised of at least a first magnetostrictive sensor, said first magnetostrictive sensor rigidly fixed on said sensor rigid collar proximate said rotating member, wherein said sensor rigid collar measurement system first magnetostrictive sensor magnetostrictively monitors a position of said rotating member sensor target to provide a measurement of a dynamic rotating positional characteristic of said rotating member.

* * * * *